(12) United States Patent
Simitsis et al.

(10) Patent No.: US 8,918,358 B2
(45) Date of Patent: Dec. 23, 2014

(54) INFORMATION INTEGRATION FLOW FRESHNESS COST

(75) Inventors: Alkiviadis Simitsis, Santa Clara, CA (US); William K. Wilkinson, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 123 days.

(21) Appl. No.: 13/274,317

(22) Filed: Oct. 15, 2011

(65) Prior Publication Data
US 2013/0097604 A1    Apr. 18, 2013

(51) Int. Cl.
G06F 17/30    (2006.01)
G06F 9/46    (2006.01)

(52) U.S. Cl.
CPC ............ *G06F 9/46* (2013.01); *G06F 17/30563* (2013.01)
USPC ....................................................... 707/602

(58) Field of Classification Search
USPC ....................................................... 707/602
See application file for complete search history.

(56) References Cited

U.S. PATENT DOCUMENTS

| | | | |
|---|---|---|---|
| 2004/0015381 A1* | 1/2004 | Johnson et al. ................... | 705/8 |
| 2005/0055308 A1* | 3/2005 | Meyer et al. ..................... | 705/38 |
| 2010/0030649 A1* | 2/2010 | Ubelhor ..................... | 705/14.66 |

OTHER PUBLICATIONS

Dayal et al., Business Process Meet Operational Business Intelligence, 2009.*
Peralta et al., On the evaluation of data freshness in data integration systems, 2004.*
Simitsis et al., Bechmarking ETL Workflows, 2009.*
Smitsis et al., Optimizing ETL Workflows for Fault-Tolerance, Mar. 2010.*
P. A. Bernstein and L. M. Haas. Information Integration in the Enterprise. Commun. ACM, 51:72-79, Sep. 2008.
U. Dayal, M. Castellanos, A. Simitsis, and K. Wilkinson. Data Integration Flows for Business Intelligence. In EDBT, pp. 1{Nov. 2009.
S. Muthukrishnan. Data Streams: Algorithms and Applications. Foundations and Trends in Theoretical Computer Science, 1(2), 2005.
F. Olken and D. Rotem. Random Sampling from Databases: A Survey. Statistics and Computing, 5(1):25-42, 1995.
A. Simitsis, K. Wilkinson, M. Castellanos, and U. Dayal. QoX-driven ETL design: Reducing the Cost of ETL Consulting Engagements. In SIGMOD, pp. 953{960, 2009.
A. Simitsis, K. Wilkinson, U. Dayal, and M. Castellanos. Optimizing ETL workflows for Fault-Tolerance. In ICDE, pp. 385-396, 2010.
K. Wilkinson and A. Simitsis. Designing Integration Flows Using Hypercubes. In EDBT, 2011.
K. Wilkinson, A. Simitsis, M. Castellanos, and U. Dayal. Leveraging Business Process Models for ETL Design. In ER, pp. 15-30, 2010.

* cited by examiner

Primary Examiner — William Spieler

(57) ABSTRACT

A computer implemented method and apparatus calculate a freshness cost for each of a plurality of information integration flow graphs and select one of the plurality of information integration flow graphs based upon the calculated freshness cost.

10 Claims, 13 Drawing Sheets

```
<DESIGN>                <NODE>                      <OUTPUT/>
  <METADATA/>              <NAME/>                  <PARAMETER/>
                           <TYPE/>                </SCHEMATA>
  <EDGES>                  <OPTYPE/>              <NDPROPERTIES>
    <EDGE>                 <SCHEMATA>               <NDPROP>
      <FROM>                 <INPUT>                  <PROPNAME/>
      <TO/>                    <ATTR>                 <EXPR>
    </EDGE>                      <NAME/>                <LEFTFUN/>
  </EDGES>                       <TYPE/>                <LEFTOP/>
                                 <ATTRPROPERTIES>       <OPER/>
  <NODES>                          <ATTRPROPERTY>       <RIGHTFUN/>
    <NODE/>                          <PROP/>            <RIGHTOP/>
  </NODES>                           <VALUE/>         </EXPR>
                                   </ATTRPROPERTY>  </NDPROP>
  <PROPERTIES/>                  <ATTRPROPERTIES> </NDPROPERTIES>
  <RESOURCES>                    </ATTR>          <NDRESOURCES/>
  <FEATURES/>                  </INPUT>           <NDFEATURES/>
<DESIGN>                                          </NODE>
```

FIG. 4

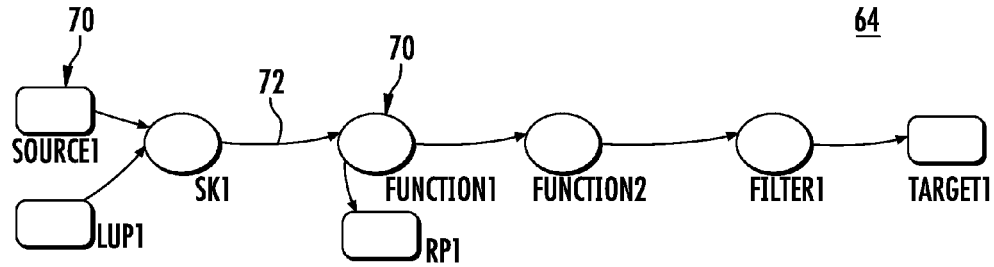
FIG. 5
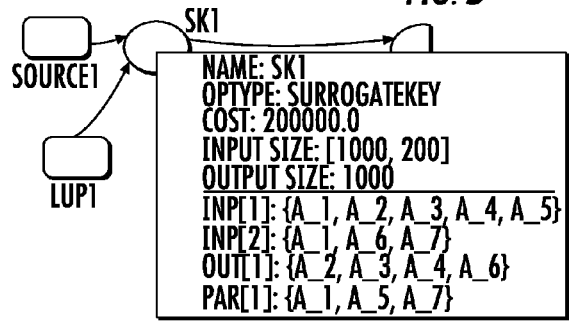
FIG. 6
FIG. 7
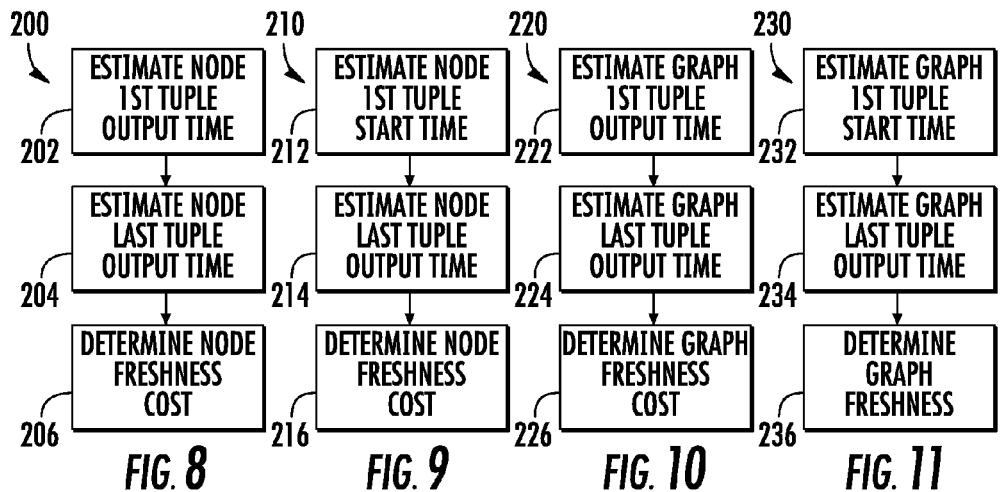
FIG. 8   FIG. 9   FIG. 10   FIG. 11

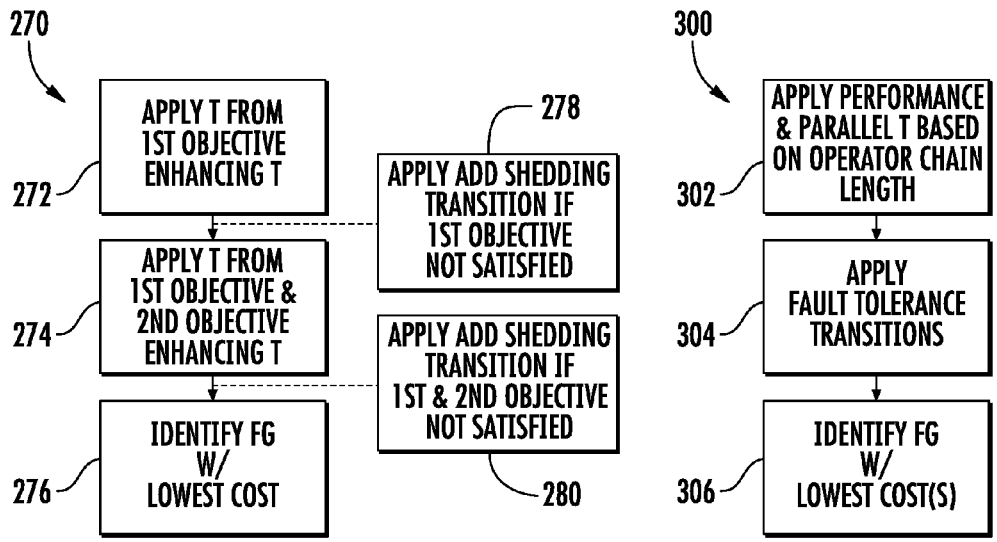
FIG. 16
FIG. 16A
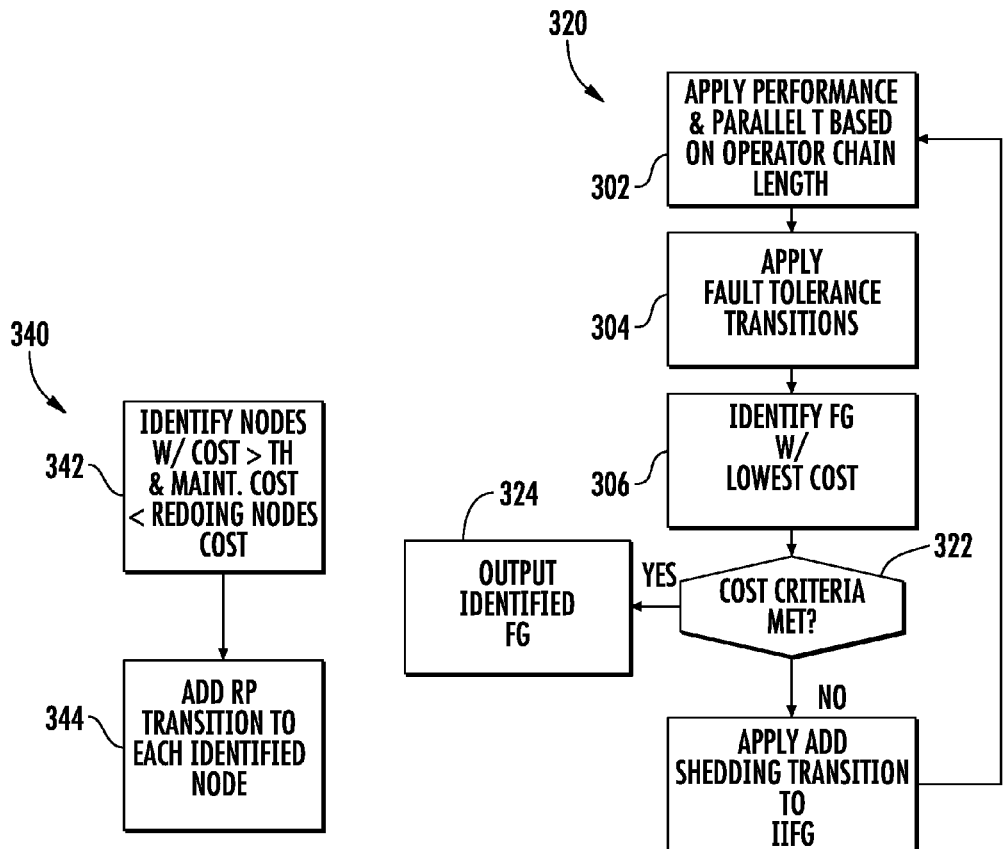
FIG. 17
FIG. 18

INFORMATION INTEGRATION FLOW FRESHNESS COST

CROSS-REFERENCE TO RELATED PATENT APPLICATIONS

The present application is related to copending U.S. patent application Ser. No. 13/274,314 filed on the same day herewith by Alkiviadis Simitsis and William K. Wilkinson and entitled MODIFIED FLOW GRAPH DEPICTION, the full disclosure of which is hereby incorporated by reference. The present application is related to copending U.S. patent application Ser. No. 13/274,316 filed on the same day herewith by Alkiviadis Simitsis, William K. Wilkinson and Umeshwar Dayal and entitled USER SELECTED FLOW GRAPH MODIFICATION, the full disclosure of which is hereby incorporated by reference. The present application is related to copending U.S. patent application Ser. No. 13/274,315 filed on the same day herewith by Alkiviadis Simitsis, William K. Wilkinson and Umeshwar Dayal and entitled OPTIMIZER, the full disclosure of which is hereby incorporated by reference.

BACKGROUND

Information integration is the combining of data from multiple heterogeneous sources into a unifying format for analysis and tactical decision-making. Such information integration may be costly in terms of both computing resources and time.

BRIEF DESCRIPTION OF THE DRAWINGS

FIG. 4 is a diagram illustrating an example of xLM elements.

FIG. 5 is a diagram illustrating an example flow graph.

FIG. 6 is a diagram illustrating an example of node schemata.

FIG. 7 is a diagram illustrating example mapping of schematafields to aliases.

FIG. 8 is a flow diagram of an example method for determining freshness cost for a node.

FIG. 9 is a flow diagram of another example method for determining freshness cost for a node.

FIG. 10 is a flow diagram of an example method for determining freshness cost for a flow graph.

FIG. 11 is a flow diagram of another example method for determining freshness cost for a flow graph.

FIG. 16 is a flow diagram of an example method for modifying a flow graph.

FIG. 16A is a flow diagram of another example method for modifying a flow graph.

FIG. 17 is a flow diagram of another example method for modifying a flow graph.

FIG. 18 is a flow diagram of a method for adding a replication transition to a flow graph.

DETAILED DESCRIPTION OF THE EXAMPLE EMBODIMENTS

Figure 1:
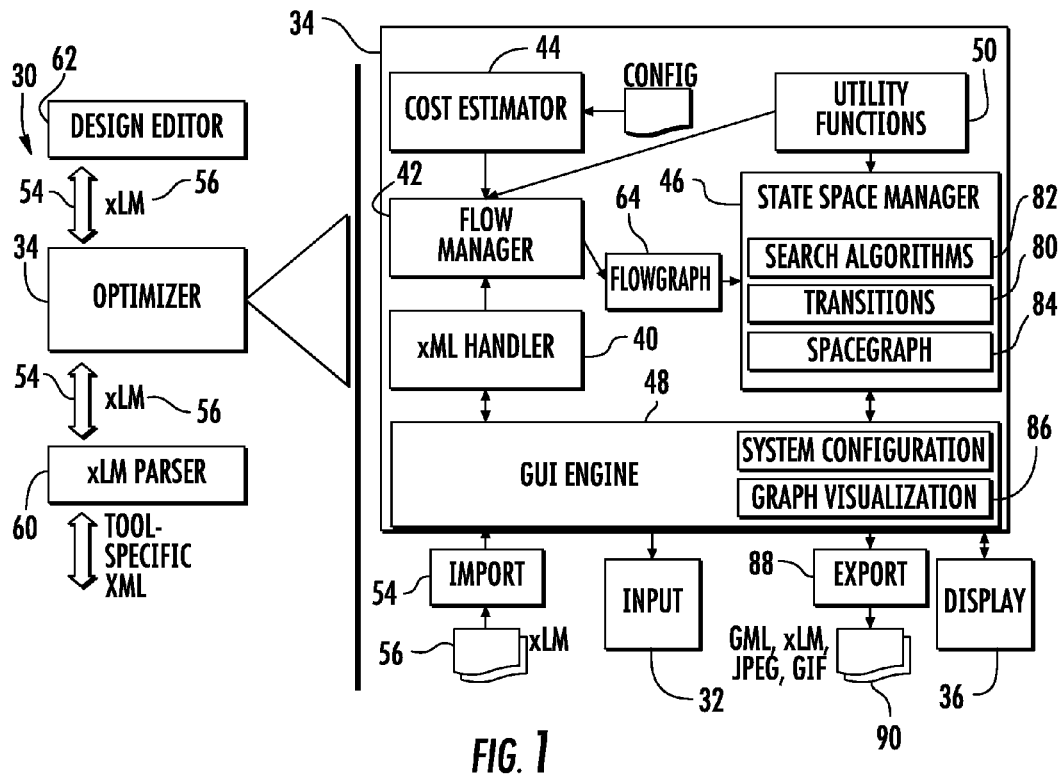
FIG. 1 is a schematic illustration of an example information integration optimization system.

FIG. 1 schematically illustrates an example of an information integration optimization system 30. Information integration optimization system 30 uses one or more heuristics to modify an existing information integration flow plan to lower a cost of the plan or to satisfy other objectives pertaining to the existing information integration flow plan. System 30 comprises input 32, optimizer 34 and display 36.

Input 32 comprises one or more devices to facilitate the input of data and commands to optimizer 34. Input 32 may comprise a keyboard, a mouse, a touch screen, a touchpad, a microphone and speech recognition software and the like. As will be described hereafter, input 32 is used to provide optimizer 34 with selections with regard to the display and optimization of an initial integration flow graph.

Display 36 comprises an output device, such as a monitor, display screen or the like, to visually present information pertaining to the optimization of the initial integration flow graph. Display 36 may be used to visually monitor the optimization process. Display 36 may be used to debug or selectively alter the optimization process. The example illustrated, display 36 also serves as one of the devices of input 32, providing graphical user interfaces that may be selected, such as with a cursor input or touch (when display 36 comprises a touch screen).

Figure 2:
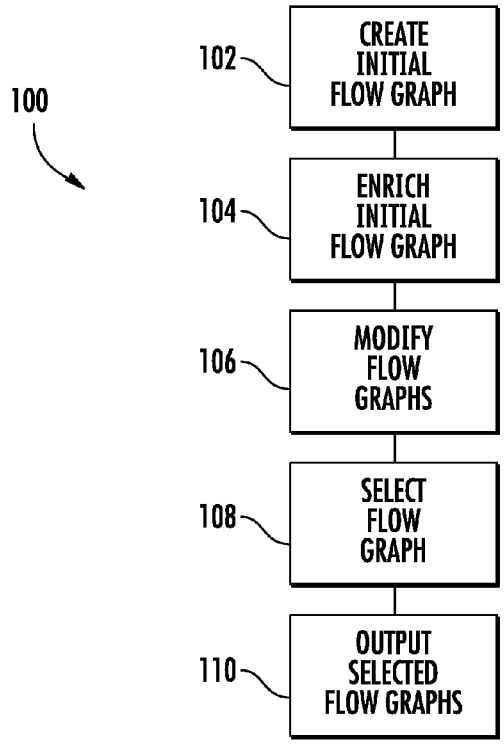
FIG. 2 is a flow diagram of an example method that may be carried out by the system of FIG. 1.

Optimizer 34 comprises at least one processing unit and associated tangible non-transient computer readable mediums which contain instructions and source data for the at least one processing unit. For purposes of this application, the term "processing unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, a processing unit may be embodied as part of one or more application-specific integrated circuits (ASICs). Unless otherwise specifically noted, the controller is not limited to any specific combination of hardware circuitry and software, nor to any particular source for the instructions executed by the processing unit. The at least one processing unit and computer readable medium embody the following components or modules: xLM handler 40, flow manager 42, cost estimator 44, state space manager 46, graphical user interface (GUI) engine 48 and utility functions 50. XLM handler 40, flow manager 42, cost estimator 44, state space manager 46, graphical user interface (GUI) engine 48 and utility functions 50 carry out the general optimization method 100 shown in FIG. 2.

GUI Engine. GUI engine 48 and XLM handler 40 cooperate to create an initial flow graph as set forth in step 102 (shown in FIG. 2). As shown by FIG. 1, GUI engine 48 receives an import 54 comprising a flow design 56 represented in xLM. As shown on the left side of FIG. 1, the import of the flow design in xLM may be provided by either a parser 60 or a design editor 62. Parser 60 translates a tool specific xML flow design, such as the example Kettle flow design 68 shown in FIG. 3, to a more generic xML format, an example of which is shown in FIG. 4.

Figure 3A:
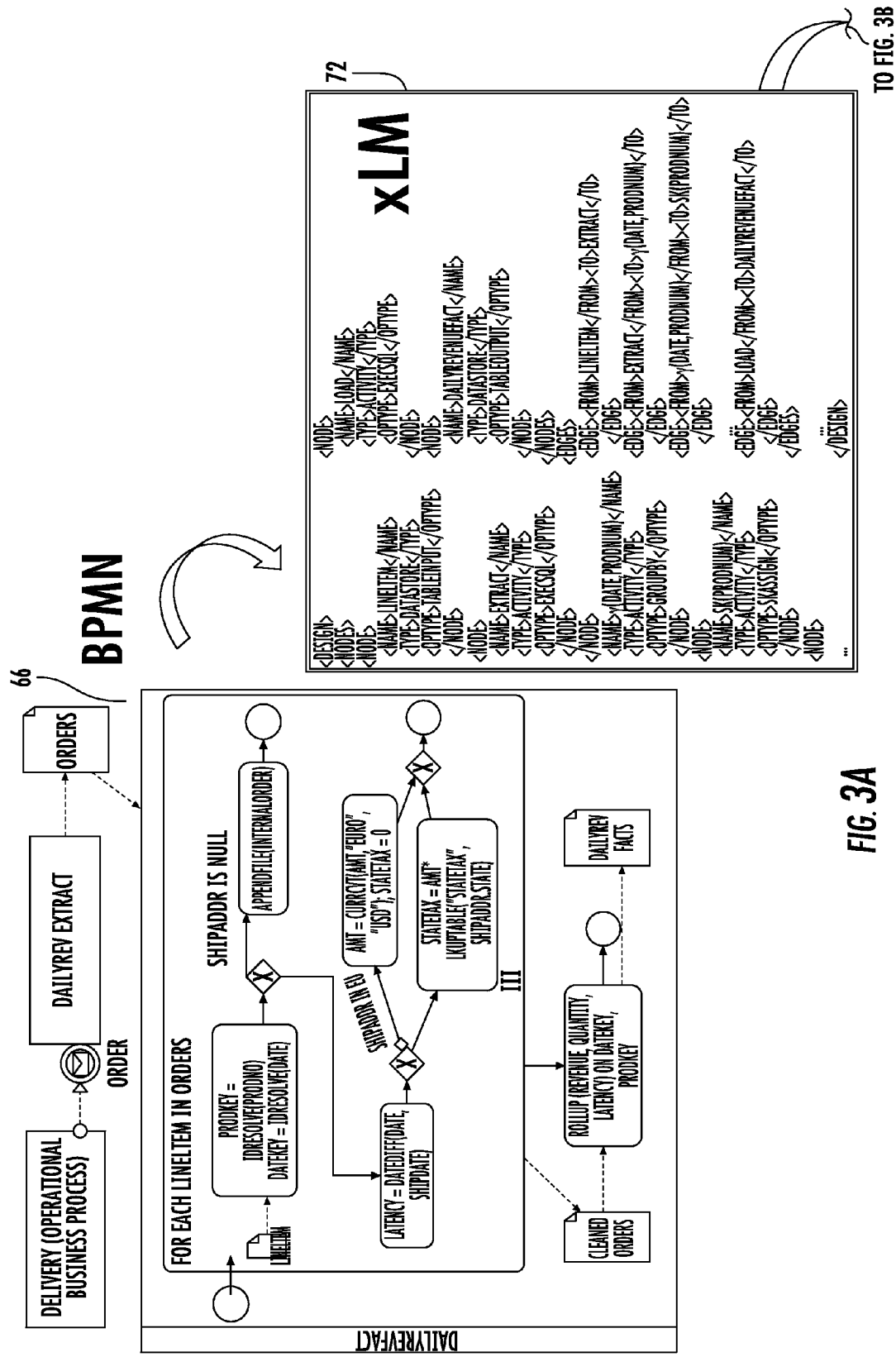
FIG. 3 is a diagram illustrating a formation and translation of an example information integration flow plan.
Figure 3B:
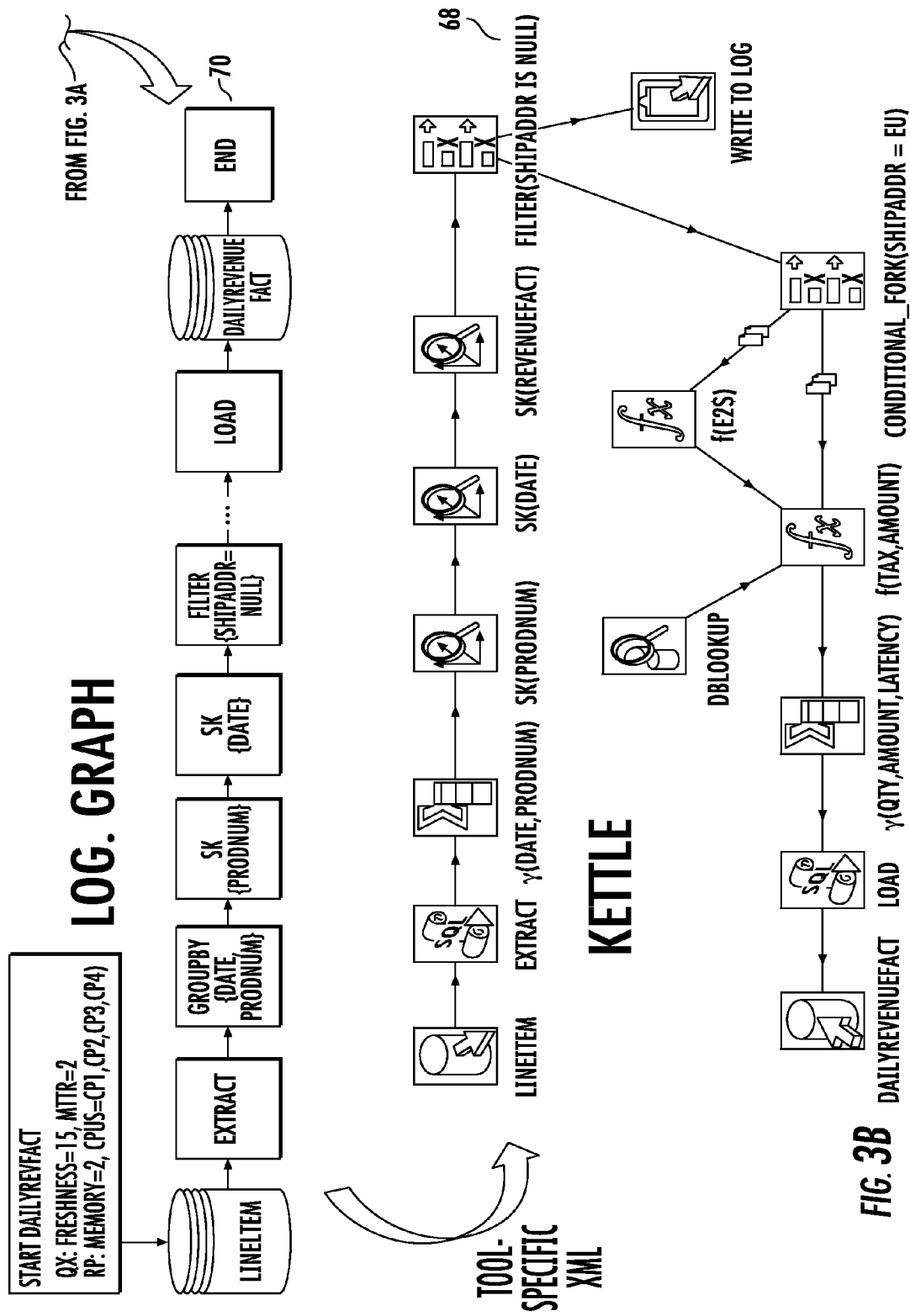

FIG. 3 illustrates an example information integration scenario that may be translated by parser 60 for optimization by system 30. The example shown in FIG. 3 illustrates how operational business processes related to orders and products create reports on daily revenue. Business requirements and needs for such data are captured as a conceptual model 66, which is expressed in terms of BPMN (BusinessProcess Modeling Notation). The conceptual model 66 is subsequently converted to a logical model 70. To create logical model 70, the produced BPMN diagrams is mapped to XPDL (the defacto standard for xML serialization for BPMN models). The logical model 70 is then translated to a physical model 68, a tool specific xML. A discussion of the generation of logical and physical models from a business requirements model are provided in co-pending WIPO Patent Application Serial Number PCT/US2010/052658 filed on Oct. 14, 2010 by Alkiviadis Simitsis, William K Wilkinson, Umeshwar Dayal, and Maria G Castellanos and entitled PROVIDING OPERATIONAL BUSINESS INTELLIGENCE, the full disclosure of which is hereby incorporated by reference. As noted above, parser 60 translates the physical model 68 to generic xML format for use by optimizer 34. Alternatively, the information integration design flow 56 represented in xLM may be created directly from a conceptual module by design editor 62.

xLM Hander. The xLM Handler module 40 is responsible for translating a flow design 56 represented in xLM into a graph structure, flow graph 64, interpretable by the optimizer 34. XLM handler module also writes the flow graph 64 into an xLM file using Simple API for xML (SAX) parsing. The xLM Handler module uses SAX to parse the input file 56 to produce two lists containing a set of FlowNode objects 70 and a set of edges 72 (i.e., <ns; nt> pairs of starting ns and ending nt points of an edge) interconnecting these nodes.

FIG. 5 illustrates one example of an initial integration flow graph 64. As shown by FIG. 5, flow graph 64 represents an information integration flow comprising nodes 70 (e.g., flow operations and data stores) and edges 72 interconnecting nodes 70. Internally, flow graph 64 is implemented as two data structures: (a) a graph, whose nodes and edges carry integer keys; and (b) a hash map, whose keys are integers connecting to the graph and values are FlowNode objects:

Graph <Integer, Integer>
HashMap <Integer, FlowNode>.

This implementation provides efficiency and flexibility. On the one hand, graph operations (e.g., traversal) are achieved without requiring expensive operations in terms of time and space. On the other hand, hashing offers fast retrieval and makes future FlowNode modifications transparent to the system. The graph 64 is implemented as a directed, sparse graph that permits the existence of parallel edges. Flow graph 64 provides a lightweight structure that keeps track of how nodes are interconnected; essentially, representing the data flow and flow control characteristics.

In addition, flow graph 64 also contains information about the flow cost, the flow status (used in the state space; e.g., minimum-cost state, etc.), and location coordinates used when drawing the graph.

Each flow node 70 in flow graph 64 may be one of various types, representing either operation, data store or an intermediate. Operation nodes stand for any kind of transformation or schema modification; e.g., surrogate key assignment, multivariate predictor, POS tagging, and so on. These are generic operations that map into the most frequently used transformations and built-in functions offered by commercial extract-transform-load (ETL) tools.

Data store nodes represent any form of persistent storage; e.g., text files, tables, and so on. Typically, such nodes are either starting or ending points of the flow. Although its name implies persistence, a data store may also represent a source of incoming, streaming data. Despite the differences in processing between persistent and streaming data, the semantics needed by the Optimizer can be captured by the underlying structure of FlowNode 70.

Intermediate nodes represent temporary storage points, check-points, and other forms of storage that may be needed at an intermediate point of the integration flow. Internally, a FlowNode or node 70 keeps track of additional information such as: operation type (any type from the taxonomy of integration operations), cost, selectivity, throughput, input data size(s), output data size(s), location coordinates, and others. Information like selectivity and throughput are passed into the optimizer as xLM properties; such measures typically are obtained from monitoring ETL execution and/or from ETL statistics. Input and output data sizes are dynamically calculated given the source dataset sizes. In addition, each FlowNode or node 70 may have a series of Boolean properties like is Parallelizable, is Partitioned, is Replicated, etc. that are used for determining how a certain flow node 70 should be used during optimization; for example, whether it could participate in partitioning parallelism.

Finally, each flow node 70 may contain a set of schemata: input (its input), output (its output), parameter (the parameters that it needs for its operation), generated (fields that are generated by its operation), and projected-out (fields that are filtered out by its operation). All schemata are implemented as lists of FlowNode Attribute. FlowNode Attribute is a structure capturing the name, type, properties, and other information of a field. FIG. 6 shows an example flow node named SK1, whose operation type is surrogate key assignment. SK1 which has two input schemata coming from a source data store (Source1) and a lookup table (LUP1), and one output schema. Its parameter schema contains fields a1, a5, and a7 that stand for Source1:PKey, Source1:Src, and LUP1:Source, respectively (see also FIG. 7). As SK1 replaces a1 (PKey)

with a6 (SKey), it filters out a1 and a5; these two fields comprise its projected-out schema.

CGP. Before creating the graph, handler 40 visits operation nodes and derives their generated and projected-out schemata. This process is described by the CGP algorithm shown below.

```
Input: A list containing nodes: allNodeList
HashSet h_in ← ∅, h_out ← ∅, h_tmp ← ∅;
List gen ← ∅, pro ← ∅;
foreach n ∈ allNodeList do
    if n is not an operation then continue;
    h_in ← all n.in; // find in schemata
    h_out ← all n.out; // find out schemata
    h_tmp add h_out; // gen = out − in
    h_tmp remove h_in;
    gen ← h_tmp
    sort gen;
    n.gen = gen; // update n
    h_tmp ← ∅;
    h_tmp add h_in; // pro = in − out
    h_tmp remove h_out;
    pro ← h_tmp;
    sort pro;
    n.pro = pro; // update n
end
return updated allNodesList;
```

Briefly, the generated schema is produced as: gen=out−in, and the projected out schema as: pro=in−out. Since there may be more than one input and output schema, handler 40 uses a hash set to remove duplicate fields; i.e., those that exist in more than one schema. Then, after applying the above formulae, handler 40 uses a list for sorting the fields and at the end, updates the node with the produced schemata; i.e., FlowNodeAttribute lists (fields sorted in order are to facilitate internal schema comparisons where all fields of a schema are represented as a string and thus, schema comparisons essentially become string comparisons.).

Attribute Aliases. For avoiding semantic problems with fields participating in node schemata, handler 40 replaces all field names with an alias that uniquely identifies a field throughout the flow; all semantically equivalent fields share the same alias. Handler 40 does the same for all parameters too. For example, a price field may have different semantics at different places in the flow; it may represent values in different monetary units, e.g., dollars or euros. Similarly a date field may describe dates in different formats, e.g., \MM-DD-YYYY" or \DD-MM-YYYY". Assuming that there are two operations that use price and date, respectively, as parameters, the underlying, field semantics are clarified. Therefore, handler 40 assigns appropriate aliases to fields, based on the semantics they carry.

For the previous two examples, handler 40 uses four different aliases. An alias is created as follows. First, handler 40 creates a field signature as a composition of the field name, field type, and field properties. Then, handler 40 uses a hash table that has field signatures as keys and aliases as values. Without loss of generality, an alias is created as a concatenation of a short string \a" and an alias counter fcnt. When handler 40 processes a field, if a lookup into the hash table returns a match, then the field is mapped to the returned alias; if there is no match, a new alias is created. FIG. 7 shows an example mapping of fields to aliases with field signatures also shown.

Flow Manager. The flow manager module 42 and cost estimator 44 enrich and maintain flow graph 64 per step 104 in FIG. 2. Flow manager module 42 obtains the flow graph 64 from handler 40 and supplements it or completes it. During optimization, flow manager 42 further maintains flow graph 64. Typical operations performed by flow manager 42 include: calculation of input/output data sizes of a node, cost estimation for a node and for the entire flow (in synergy with Cost Estimator 44), adjustment of node schemata after a transition takes place during the optimization, and visual representation of a FlowGraph.

Compute data sizes. The PFG algorithm below describes how a flow graph is enriched with information about input/output data sizes and costs.

```
input : A FlowGraph G
Queue T ← topologicalSort(G);
while T ≠ ∅ do
    n ← T.pop( );
    if n is a source datastore then n.out = n.in;
    else
        n.in ← ∅;
        foreach p ∈ predecessors(n) do n.in_p = p.out;
        calculate n.out;
    calculate n.cost;
    updateNode(G,n);
end
calculate G.cost;
return G;
```

Flow manager 42 uses the flow graphs produced by xLM Handler and also, at several points during optimization for readjustment of sizes and costs. Starting from the source nodes (according to a topological sort of the graph), flow manager 42 calculates the output data size and cost of each node, and then, calculates the cost for the entire flow. The output data sizes are calculated as follows. If a node is a source data store, then its output data size equals its input data size. Otherwise, the data size of every input of a node n, equals the output data size of the respective provider of n. Then, flow manager 42 calculates the output data size as a function of the input data size, the selectivity sel, and a weight, $w_{out}$. This task as well as costs estimation are performed by the Cost Estimator module 44 as described below. When the input and output data sizes and the cost of a node have been determined, flow manager 42 updates flow graph 64.

Regenarate schemata. Each time a transition is applied to flow graph 64, a new modified flow graph is produced. However, the schemata of the nodes of the new flow graph might need readjustment. For example, consider a sentiment analysis flow and let Tokenizer be an operation that gets as input fsentence; authorg and outputs fword; authorg. Let FilterOutBlackListedAuthors be a subsequent operation with input fword; authorg and output fword; authorg. One might say that depending on the filter's selectivity, flow manager 42 may move the filter before the tokenizer. Such a swap would be applicable since the filter acts on authors, whilst the tokenizer acts on sentences. However, when the filter is placed before the tokenizer, flow manager 42 updates its input and output schema and replaces the word field with sentence.

The RAS algorithm readjusts the node schemata of a FlowGraph as shown below.

```
Input : A FlowGraph G
Queue T ← topologicalSort(G);
while T ≠ ∅ do
    n ← T.pop( ):
    if n is an intermediate node then
        n.in ← ∅;
        foreach p ∈ predecessors(n) do        // find inputs
            if n is an operation then n.in = p.out;
        end
```

-continued

```
updateNode(G,n);
if n is an operation then
    n.in ← ∅;
    n.out ← ∅;
    foreach p ∈ predeeessors(n) do        // find inputs
        if n is an operation then n.in = p.out;
        else n.in = p.in;
    end
    HashSet h_in add all n.in;             // find outputs
    HashSet h_gen add n.gen;
    HashSet h_pro add n.pro;
    h_in add h_gen;                        // out = in + gen – pro
    h_in remove h_pro;
    List out ← h_in;
    sort out;
    n.out = out;                           // update n
    updateNode(G,n);                       // update G
end
return G;
```

Starting from the source nodes (according to a topological sort of the graph), flow manager 42 visits each node and regenerates its input and output schemata. Note that intermediate and data store nodes have only one schema. Of the node is an intermediate one then its input schema is populated by the output schema of its provider operation. If the node is an operation then its input schemata are populated either by the output schemata of its provider operation or the input schema of its provider data store. After having calculated the input schemata, the output schemata of an operation node can be derived as: out=in+gen−pro. RAS returns the updated flow graph 64.

Cost Estimator. The Cost Estimator module 44 is responsible for calculating node and flow costs. In addition, it also computes the output data size of a node as a function of the node's input data size. Cost estimator module 44 may perform some other tasks as well.

For computing a node's cost, cost estimator 44 utilizes a cost formula. The cost estimator uses an external configuration file, which contains cost formulae for operations supported by the Optimizer 34. There are at least three ways to obtain such formulae: (a) a cost formula for an operation derived from its source code (assuming that the execution engine gives access to it); (b) an approximate cost formula produced by a series of regression tests; and (c) a cost formula of a created operation. Similarly, the configuration file also contains formulae for calculating the output data size of a node, given its input data size. An example entry in the configuration file for a filter operation is as follows:

```
function calc_FILTER_cost(n,m) { return n; }
function calc_FILTER_out(s,n,m) { return (s)*(n); }
```

In this example, n and m denote sizes of two inputs, and s is selectivity. Since filter has only one input, m is disregarded.

Compute output size. For computing the output data size of a node, cost estimator 44 works as follows. At runtime, cost estimator 44 uses a script engine for reading the configuration file and identifying an appropriate formula for a given node. The only restriction involves the naming of the function in the file; it is a string of the form \calc <NodeOperatorType> out". Then, depending on the number of inputs that the node has, cost estimator 44 invokes the appropriate function. For one or two inputs, cost estimator 44 sets the n and m parameters. If a node has more than two inputs, then cost estimator 44 calculates its output data size as: "f(in3; f(in1; in2))". For such operations discussed above, the associative property holds and thus, this generic and extensible mechanism works fine. If the associative property does not hold, then cost estimator 44 specifically passes the input data sizes as arguments to the formula. The node's output data size is the weighted outcome of this computation. The weight, namely $w_{out}$, is useful for incorporating various aspects to the output size. For example, when a router or a splitter is added to the flow, cost estimator 44 regulates dataset sizes according to how these operators split data; e.g., $w_{out}=1/b$ for a round robin router that creates b branches. Cost estimator 44 omits a formal presentation of the algorithm for calculating the output data size, since it resembles the CNC presented next.

Compute node cost. For computing the cost of a v node, cost estimator 44 works as for the output data size. The CNC algorithm below describes this process.

```
input : A FlowNode v
oFunc = "calc_" + v.OpType + "_out";
cFunc = "calc_" + v.OpType + "_cost";
cost = 0.0; n = m = 0;
switch number of v inputs (#vin ) do
    case 0 break;
    case 1
        n = v.in_1;
        Φ(cFunc,n.m);
    case 2
        n = v.in_1;
        m = v.in_2;
        Φ(cFunc,n,m);
    otherwise
        n = v.in_1;
        for k=2 to #vin do
            m = v.in_k;
            cost = cost + Φ(cFunc,n,m);
            n = Φ'(oFunc,v.s,n,m);
        end
end
v.cost = cost × w_cost;
return v;
```

Depending on the number of node inputs, cost estimator 44 invokes the Φ Function, which uses a script engine for identifying the appropriate cost formula for the node. For one or two inputs, cost estimator 44 invokes Φ once to obtain the cost. For more than two inputs, first cost estimator 44 finds the cost for two inputs and then, adds another input invoking Φ with its data size as n and the data size of the temporary outcome of the two first inputs as m: " . . . Φ(in3; Φ'(in1; in2))". For getting the temporary, output data size of the first two inputs, cost estimator 44 invokes Φ', where v.s is the selectivity of v node. Finally, the cost of v is the weighted outcome of this computation. The weight, namely wcost, is used for taking under consideration various aspects of the optimization that affect processing cost. For example, when a part of the flow is partitioned, the processing cost for this subflow equals the maximum processing cost of the branches; i.e., the slowest branch determines the cost.

Compute flow cost. For computing the cost of a 'linear' flow, cost estimator 44 considers the summary of node costs. Hence, the processing cost c of a flow F involving I transformations would be: $c(F)=P_{l i=1} c_i$, where cv is the cost of a node v. When there are parallel branches in the flow (these may be part of the original design or introduced by the optimizer), the cost estimator takes parallelism into account.

For partitioning, cost estimator 44 focuses on the cost of the slowest branch. Cost estimator 44 also adds the costs of two new operations—router and merger with costs cR and cM, respectively—that are used for partitioning. Thus, in this case, the processing cost c(F) for a subflow involving l operations and partitioned into dN parallel branches becomes:

$$c_{(F)} = c_R + \max_j \left( \frac{\sum_{i=1}^{l} c_i}{d_{N_j}} \right) + c_M.$$

Analogously, when a part of the flow is replicated into rN replicas, then each operation is doing rN times as much work but using the same number of resources as iri the unreplicated flow. Hence, an operation cost is weighted {using a weight wR– to account for the resource sharing and additional work. In addition, cost estimator 44 also accounts for the cost of two additional operations that used for replication: a replicator (or a copy router) and a voter, with costs cR and cV, respectively. In this case, the processing cost of the replicated subflow c(F) involving I operations becomes:

$$c_{(F)} = c_R + \Sigma_{i=1}^{l}(\omega_{R_i} \times c_i) + c_V$$

Similar calculations are done when recovery points are added in the flow graph to account for the maintenance cost of those nodes as well. Note that the cost estimator 44 is generic and fairly extensible. In fact, the cost model used is not actually connected the state space manager 46. By changing the configuration file, the cost model may be changed as well. Thus, the optimization techniques are not affected by any such a change.

In the example illustrated, the cost model for each operator estimates the number of tuples (data fields or records) processed and output by each operator and estimates the processing "cost" for the operation, which could mean anything from resources used, total time, or computational complexity. The overall flow cost is then the summary of all individual operation costs).

For example, consider some simple unary and binary operators for integration flows. The example below calculates costs for unary operators selection (filter) and group-by aggregation and binary operators union and join. For each operator, one function returns an estimate of the number of output tuples and the other returns the cost of generating those tuples.

```
function calc_JOIN_out(sel,n,m) { return ( n>m ? sel*n : sel*m ) ; }
//selection
function calc_FILTERROWS_cost(n,m)    { return n; }
function calc_FILTERROWS_out(sel,n,m) { return (sel)*(n); }
//aggregation (group): nlog2n
function calc_GROUP_cost(n,m)
{return Math.round((n)*(Math.log((n)))/(Math.log((2)))); }
function calc_GROUP_out(sel,n,m) { return (sel)*(n) ; }
//union
function calc_U_cost(n,m)    { return n + m ; }
function calc_U_out(sel,n,m)    { return (sel)*(n+m); }
//join
function calc_JOIN_cost(n,m)    { return n*m ; }
```

Freshness Cost. For integration flows, the individual operators may be processed on distinct computers that communicate through a variety of networks. To address such environments, cost estimator 44 not only estimates the cost complexity of an operator but also the processing rate of the node or operator. As a simple example, a series of individual operators, where the output of one is the input of the next, an operator cannot process data any faster than the slowest of the operators in the series. Cost estimator 44 estimates the processing rate of operators and so enables optimization that depends on processing rate such as freshness.

FIG. 8 illustrates a flow diagram of an example method 204 and may be carried out by cost estimator 44 four estimating a processing rate or freshness of an individual operator or node. As indicated by step 202, cost estimator 44 estimates a first tuple output time for the node. In other words, cost estimator 44 estimates a first time at which a first tuple being processed by the node of interest will be outputted. As indicated by step 204, cost estimator 44 estimates a last tuple output time for the node. In other words, cost estimator 44 estimates a second time at which the last tuple of a series of tuples will be output by the node of interest. Lastly, as indicated by step 206, cost estimator 44 determines the processing rate or freshness cost of the particular node based upon the first tuple output time, the last tuple output time and the number of tuples in the series of tuples. In particular, cost estimator 44 determines the processing rate or freshness cost for the particular node by subtracting the first tuple output time from the last tuple output time and dividing the result by the number of tuples.

FIG. 9 illustrates method 210, a variation of method 200. Method 210 is similar to method 200 except that instead of using the first tuple output time, cost estimator 44 alternatively utilizes a first tuple start time in step 212, the time at which the particular node of interest begins in operation on the first tuple. As indicated by step 214, cost estimator 44 estimates a last tuple output time for the node. In other words, cost estimator 44 estimates a last tuple output time at which the last tuple of a series of tuples will be output by the node of interest. Lastly, as indicated by step 216, cost estimator 44 determines the processing rate or freshness cost of the particular node based upon the first tuple start time, the last tuple output time and the number of tuples in the series of tuples. In particular, cost estimator 44 determines the processing rate or freshness cost for the particular node by subtracting the first tuple start time from the last tuple output time and dividing the result by the number of tuples.

In the example illustrated, cost estimator 44 utilizes the instructions or program routine depicted above and adds two additional functions for each operator. The first operator estimates the time required for the operator to produce its first output tuple. The second operator estimates the time for the operator to produce its final output tuple. For example, below are cost functions for filter and hash join.

```
//selection
function calc_FILTERROWS_TTF(n,m) = TTF(n) + (sel)*(TT(n) – TTF(n)) + c1
// The selection must wait for the first input tuple, TTF(n).
// After that, it produces the first output tuple after sel*(TTn–TTFn) time units.
// sel is the filter selectivity. c1 is a constant representing the time to produce one output tuple.
function calc_FILTERROWS_TTL(n,m) = TTL(n) + out(n) * c1
// The selection requires TTL(n) time units to get its input and then
// requires out * c1 time units to produce its output.
//hash join
function calc_HASHJOIN_TTF(n,m) = TTF(n) + (sel) * (TTL(m) – TTF(m)) + c1
// The join must read all of the first input, TTL(n), and then read part of the second input,
// sel*(TTL(m)–TTF(m), before producing its first tuple
function calc_HASHJOIN_TTF(n,m) = TTL(n) + TTL(m) + c1*out
```

Note that these functions utilize estimates for the time for their inputs to be produced (TTF(n) and TTL(n) above) as well as estimates of selectivity, sel, and the number of output tuples, out. Each operator has an estimate of the cost to produce one output tuple, c1. In practice this value depends on the nature of the operator instance. In other words, the value of the constant depends on the operator instance, e.g., a selection operator that has a simple comparison would have a lower constant value than a selection operator that has a complex regular expression comparison.

The processing rate of an operator can be variously computed as (TTL−TTF)/out or optionally (TTL−TTB)/out, where TTB is the time that the operator starts execution. In other words, the first formula estimates production rate once the operator has started producing tuples while the second formula estimates rate over the lifetime of the operator. They determined freshness cost for individual nodes may be subsequently used by state space manager 46 when applying transitions to flow graph 64.

FIGS. 10 and 11 illustrate alternative methods for calculating the freshness cost of an overall flow graph 64 or sub flow portions of multiple operators or nodes of flow graph 64. FIG. 10 illustrates method 220. As indicated by step 222, cost estimator 44 estimates a first tuple output time for the flow graph or multi-node sub flow. In other words, cost estimator 44 estimates a first time at which a first tuple being processed by the flow graph or multi-node sub flow will be outputted. As indicated by step 224, cost estimator 44 estimates a last tuple output time for the flow graph or multi-node sub flow. In other words, cost estimator 44 estimates a second time at which the last tuple of a series of tuples will be output by the flow graph or multi-node sub flow. Lastly, as indicated by step 226, cost estimator 44 determines the processing rate or freshness cost of the flow graph or multi-node sub flow based upon the first tuple output time, the last tuple output time and the number of tuples in the series of tuples. In particular, cost estimator 44 determines the processing rate or freshness cost for the flow graph by subtracting the first tuple output time from the last tuple output time and dividing the result by the number of tuples.

FIG. 11 illustrates method 230, a variation of method 220. Method 230 is similar to method 220 except that instead of using the first tuple output time, cost estimator 44 alternatively utilizes a first tuple start time in step 232, the time at which the flow graph or multi-node sub flow begins in operation on the first tuple. As indicated by step 234, cost estimator 44 estimates a last tuple output time for the flow graph or multi-node sub flow. In other words, cost estimator 44 estimates a last tuple output time at which the last tuple of a series of tuples will be output by the flow graph or multi-node sub flow. Lastly, as indicated by step 236, cost estimator 44 determines the processing rate or freshness cost of the particular node based upon the first tuple start time, the last tuple output time and the number of tuples in the series of tuples. In particular, cost estimator 44 determines the processing rate or freshness cost for the flow graph or multi-node sub flow by subtracting the first tuple start time from the last tuple output time and dividing the result by the number of tuples.

In examples were cost estimator 44 is determining the freshness cost of each individual operator are node, the overall rate for the flow may computed computed as the maximum TTL value for all operators in the flow using the above program routine.

State Space Manager. State space manager 46 (shown in FIG. 1) creates and maintains a state space which comprises the different modified flow graphs that may be derived from the initial flow graph 64 using transitions 80. State space manager 46 carries out step 106 shown in FIG. 2 by selectively applying transitions 80 to the initial integration flow graph 64 to produce modified information integration flow graphs and applies transitions to the modified information integration flow graphs themselves using one or more heuristics or search algorithms 82. The sequential application of transitions forms one or more paths of flow graphs or states which form the space graph 84 (shown in FIG. 1).

As used herein, the term "transition" refers to a transformation of an integration flow plan into a functionally equivalent integration flow plan. Two integration flow plans are functionally equivalent where they produce the same output, given the same input. Various transitions and combinations of transitions may be used on a query plan to improve the plan's performance. There may be a large number of transitions that may be applied to a given integration flow plan, particularly where the plan is complex and includes numerous operators. Examples of transitions that may be applied to initial integration flow graph 64 by state space manager 66 include, but are not limited to, swap (SWA), distribution (DIS), partitioning (PAR), replication (REP), factorization (FAC), ad recovery point (aRP) and add shedding (aAP). Examples of other transitions may be found in co-pending U.S. application Ser. No. 12/712,943 filed on Feb. 25, 2010 by Alkiviadis Simitsis, William K Wilkinson, Umeshwar Dayal, and Maria G Castellanos and entitled OPTIMIZATION OF INTEGRATION FLOW PLANS, the full disclosure of which is incorporated by reference.

Figure 12:
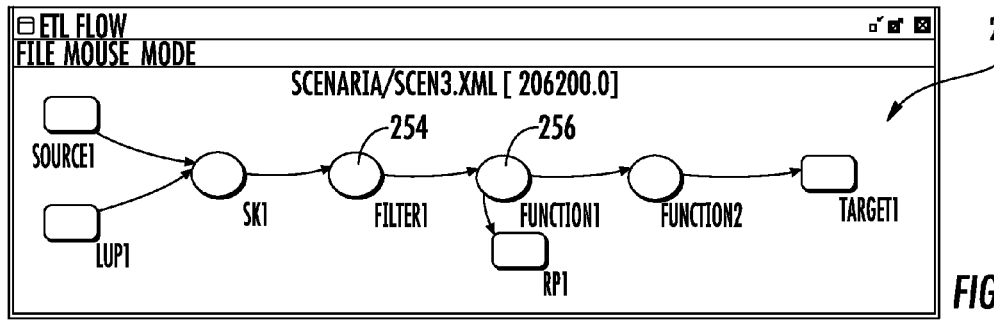
FIG. 12 is a diagram illustrating an example initial information flow graph.
Figure 13:
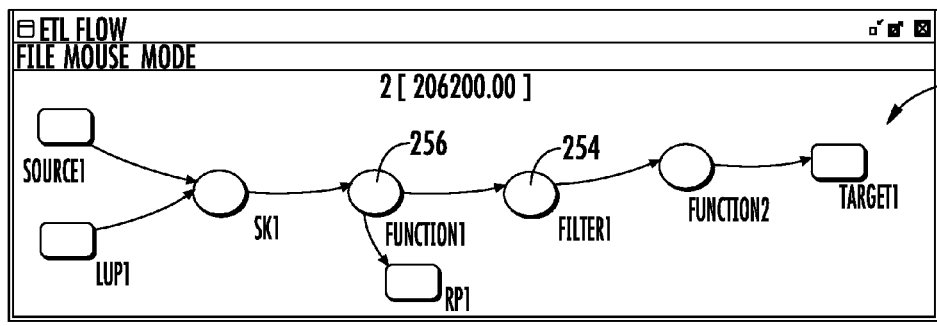
FIG. 13 is a diagram illustrating an example of a swap transition applied to the flow graph of FIG. 12.

Swap (SWA). FIGS. 13-15 and FIG. 20 illustrate examples of the aforementioned transitions being applied to an initial example flow graph 250 shown in FIG. 12. FIG. 13 illustrates an example of the application of a swap transition to flow graph 250. The SWA transition may be applied to a pair of unary (i.e. having a single output) operators occurring in adjacent positions in an integration flow plan. The SWA transition produces a new integration flow plan 252 in which the positions of unary operators or nodes 254 and 256 have been interchanged.

Before swapping two unary operation nodes, v1 and v2, state space manager module 46 performs a set of applicability checks. The two nodes should: (a) be unary operations that are adjacent in the flow; (b) have exactly one consumer operation (but, they may as well connect to intermediate nodes); (c) have parameter schemata that are subsets of their input schemata; and (d) have input schemata that are subsets of their providers' output schemata (c) and (d) should hold both before and after swap. Subsequently, the swap proceeds as depicted below

```
input: A FlowGraph G, two unary operations v₁, v₂
if¬ passChecks {(a)-(d)} then exit:
  e_pro ← inEdges(v₁);              // v₁ is unary, only one edge
  v_pre = src(e);
foreach e ∈ outEdges(v₁) do         // v₁'s intermediate nodes
  v = dest(e);
  if v is intermediate node then v.x = v₂.x; update(G,v);
end
foreach e ∈ outEdges(v₂) do
  v = dest(e);
  if v is intermediate node then
    v.x=v₁.x;      // upd the x-loc of the intermediate node
    update(G,v);
  else
    v_post = v;
    e_post = e;
end
e_v₁,e₂ ← findEdge(v₁.v₂);
(x,y) = (v₁.x, v₁.y );              // interchange v₁, v₂ coordinates
(v₁.x, v₁.y) = (v₂.x, v₂.y);
(v₂.x, v₂.y) = (x,y);
update(G,v₁);
update(G,v₂);
remove e_pre, e_post, e_v₁.v₂;
add e(v_pre,v₂), e(v₁,v_post), e(v₂,v₁);
RAS(G);                             // readjust schemata
check (c) and (d);
PFG(G);             // recalculate data sizes and costs
return an updated G;
```

First, manager 46 finds the provider $V_{pre}$ of v1 and the consumer $v_{post}$ (that is an operation) of v2. Then, manager 46 swaps the location coordinates of v1 and v2 and replace old edges with new ones that connect $V_{pre}$ to v2, $v_1$ to $v_{post}$, and v2 to v1. Note that if an intermediate node is connected to either v1 or v2 operations, it follows the respective operation. Finally, manager 46 updates (only) the affected schemata, data sizes, and costs, and returns the updated flow graph.

Figure 14:
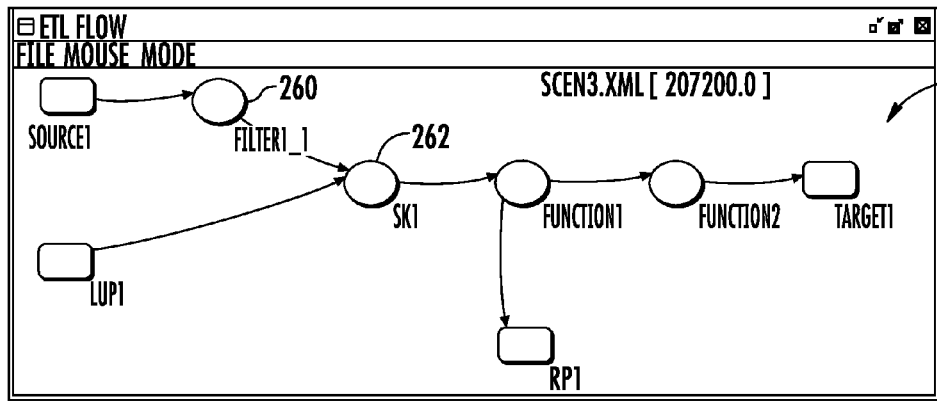
FIG. 14 is a diagram illustrating an example of a distribution transition applied to the flow graph of FIG. 12.

Distribution (DIS). FIG. 14 illustrates an example application of a DIS transition to the flow graph 252 form a modified flow graph 258. As shown below, after manager 46 performs a set of checks and as shown in the example pseudocode below, a unary operation v2 (260) is moved in front of an n-ary operation v1 (262).

```
input : A FlowGraph G, an n-ary operation v₁ and a unary v₂
if¬ passChecks then exit;
foreach v ∈ successors(v₂) do
    if v is operation then v_post ← v;
    else List l_post ← v:
end
dF = false;
foreach v ∈ predeccessors(v₁) do
    // v₂ moves only in front of v₁.in that depend on it
    if v is operation then
        if v₂.param ⊂ v.out then dF = true;
    else if v₂.param ⊂ v.in then dF = true;
    if dF then
        create v₂_new;         // a new v₂_new for each qualified v
        v₂_new.x.= v₁.x;
        v₂_new.y= v.y;
        add v₂_new to G;
        remove edge e(v, v₁);
        add edges e(v, v₂_new), e(v₂_new, v₁);
        for u ∈ l_post do // keep nodes in l_post close to v₂_new
            u.x = v₂_new.x;
            u.y = v₂_new.y + ξ/2
            add u to G;
            add edge e(v₂_new, u);
        end
    end
    if dF then
        v₁.x = v₂.x;
        remove edges e(v₁, v₂), e(v₂, v_post):
        remove v2, v∈l_post from G:
        add edge e(v₁, v_post);
    RAS(G);                     // readjust schemata
    PFG(G);                     // recalculate data sizes and costs
    return an updated G;
```

Note that v2 is moved only after v1 providers that output fields participating in v2 parameter schema. For each qualified move, a copy of v2, namely $v2_{new}$, is created. Different $v2_{new}$ instances have different IDs and a different alias added to their names. After the distribution of v2 over v1, manager 42 incrementally regenerates schemata and recalculates data sizes and costs.

Figure 15:
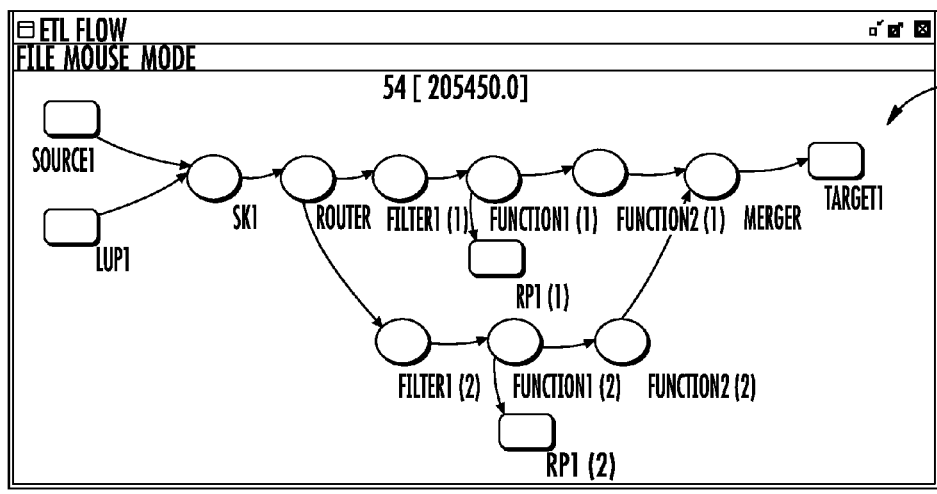
FIG. 15 is a diagram illustrating example of a partitioning transition applied to the flow graph of FIG. 12.

Partition (PAR). FIG. 15 illustrates an example of a partition transition applied to the flow graph 252 form modified flow graph 266. The pseudocode for partition a (sub)flow is described below.

```
input : A FlowGraph G, two operations v₁, v₂, #branches d_N,
        partition policy P_R, merge policy P_M
if¬ passStructuralChecks then exit;
p ← path(v₁, v₂);
create v_R;                     // create router based on P_R
set v_R.w_out depending on P_R;
v_R.x = v₁.x + (v₂.x−v₁.x)/(sizeOf(p)+2);
v_R.y =v₁.y;
add v_R to G:
create v_M;                     // create merger based on P_M
v_M.x = v₁.x + (v₂.x−v₁.x)/(sizeOf(p)+2) × (sizeOf(p)+1):
v_M.y = v₁.y;
add v_M to G;
cnt = 0;                        // create partition branches
foreach node u between v₁ and v₂ do
    for i=2 to d_N do
        create u_i;
        set u_i.w_out depending on P_R;
        u_i.x = v₁.x + (++cnt) × (v₂.x − v₁.x)/(sizeOf(p)+2);
        u_i.y = (u.x+sizeOf(dfs(G,u,w)) + S)× i, x.t. ∃e(u,w)∈p;
        add u_i to G;
    end
    create partition branches for DAGs starting from v;
    rename u to u₁;
    update(G,u₁);
end
foreach branch node u do        // create branch edges
    foreach edge e(u, w) do create edge e(u_i, w_i) ∀ i∈(1,d_N)
end
remove edge e(v₁, w) from p;    // add edges for v_R
add edges e(v₁, v_R), e(v_R,w_i)∀ i∈[1.d_N]:
remove edge (z, v₂) from p;     // add edges for v_M
add edge e(v_M, v₂), e(z_i, v_M) ∀ i∈[1,d_N];
RAS(G);                         // readjust schemata
PFG(G);                         // recalculate data sizes and costs
return an updated G;
```

PAR takes as inputs a FlowGraph G, the starting v1 and ending v2 nodes, the number of partition branches dN, and the partition PR and merge PM policies. After some applicability checks, manager 46 finds the path p connecting v1 to v2. Next, manager 46 creates a router and a merger and adds them to G. (When a node is created, manager 46 set properties like name, type, id, etc., and also adds it to the graph and hash map of FlowGraph.). Depending on PR and PM, manager 46 sets their operation types and tunes cost and size related parameters. For example, $w_{out}$ for a round robin router equals $1=d_N$ for all branches, whilst for a hash based router wout is different for each branch. Next, manager 46 creates $d_{N-1}$ instances of each node in p. Manager 46 rename each node as: <name>+'(i)', where i is the branch id; this is 1 for the original nodes and goes from 2 to dN for other branches {e.g., SK1 (1), SK2 (2). If for a node in p there exist dangling nodes (e.g., an intermediate node), manager 46 adds them to the branches too. After having created branch nodes, manager 46 connects them to each other with appropriate edges. Finally, manager connect the router and merger to their predecessors and successors. Note, that manager 46 takes extra care for recalculating location coordinates for nodes. In FIG. 13, ε is a configurable parameter denoting a y-offset; the default value is 50 pt. Typically, PAR requires layout expansion, since it significantly changes a flow. As after every transition, manager 42 and cost estimator 44 regenerate schemata and recalculate data sizes and costs.

Replication (REP). Replication works similarly to PAR. Two new operation nodes are added to the flow: a replicator (works like copy router) and a voter. As in PAR, manager 46 creates a number of replicas rN and connects them to the newly added nodes. Typically, the $w_{out}$ for the replicator equals rN. The cost of each replica node is weighted appropriately to account for resource sharing.

Factorization (FAC). Factorization works similarly to DIS. A number of unary operations vi are moved after an n-ary operation v2. The unary operations should be homologous. Note that the homologous vi should connect only to v2 inputs that have fields participating in vi's parameter schemata.

AddRecoveryPoint (aRP). Adding a recovery point to an operation v is straightforward. Its placement on the flow relates to v's position (this might lead to a layout expansion as described hereafter).

AddShedding (aAP). When an OF for a given flow cannot be satisfied, manager 46 may try reducing the amount of data to be processed. In such a case, manager 46 carries out a two-phase process: the first phase sheds tuples and brings fast, but approximate results, while the second, slower phase adds to the results data left out from the first phase. Although in practice approximation can be ingested in a flow either as an individual operation or as a property of existing operations {e.g., an approximate join{ without loss of generality, manager 46 treats approximation as a flow operation with its own characteristics. Hence, aAP(G, v, PA, f) adds to a FlowGraph G, after a node v, a new operation, namely shedder, that samples incoming data and sheds tuples with a factor f. The formulae for calculating its cost and output data size depend on the approximation policy PA. Apart from changing the dataset, aAP may change the data schema as well. For example, for reducing data size, we may choose to both shed data and project out less critical fields; these choices depend on PA.

Example techniques for sampling data include, but are not limited to, random sampling, uniform sampling, and reservoir sampling. In addition, QoX-driven approximation may be based on business requirements; e.g., approximation may work in favor of a certain target or a certain source that should be prioritized based on SLAs. For example, in a sentiment analysis flow manager 46 may first process posts coming from frequent authors or postpone processing posts/reviews related to products that are less interesting for the business analysis at a given time. Note, however, that the PA choice is orthogonal to the optimization process.

The state space manager 46 uses a library of algorithms for producing a state satisfying one or more given Objective Functions, OF. Note that OF is a parameter to the search algorithms and therefore, the optimization does not depend on a specific OF selection. FIG. 16 illustrates one example of a process or method 270 that may be used by manager 46 for carrying out a heuristic to selectively apply transitions to flow graph 64 (or derivatives thereof) and to identify a modified flow graph that best meets one or more objective functions. As indicated by step 272, state space manager 46 selection applies a transition (T) from a set of first objective enhancing transitions to an initial information integration flow graph based upon how application the transition impact a length of a chain of nodes to produce a first set of modified information integration flow graphs that satisfy a first objective.

As indicated by step 274, state space manager 46 then selection applies a second transition (T) from the set of first objective transitions and a second set of objective enhancing transitions to the first set of modified information integration flow graphs to produce a second set of modified information integration flow graphs that satisfy both the first objective and the second objective. Lastly, as indicated by step 276, state space manager 46 that identifies an information integration flow graph from the first set and the second set of modified information integration flow graphs that has the lowest cost (i.e., the lowest computing time).

As indicated by step 278, if none of the flow graphs of the first set of modified information integration flow graph satisfy the first objective, state space manager 46 may additionally apply an add shedding transition each of the flow graphs of the first set of modified information integration flow graphs. As indicated by step 280, if none of the flow graphs of the first set and the second set of modified information integration flow graphs satisfy the first objective and the second objective, state space manager 46 may additionally apply add shedding transition to each of the integration flow graphs of the first set and the second set. In other examples, this addition of add shedding transitions may be omitted.

As described above, method 270 selects and adds specific types of transitions in a phased manner to identify a flow graph that satisfies multiple objectives and which has the lowest computing cost (the fastest computing time). With each additional phase, state space manager 46 applies one or more transitions focused on enhancing a new or additional particular objective. Examples of objectives that may be pursued with the application of specific types of transitions include, but are not limited to: (1) performance or cost—the computing time to complete an information integration; (2) fault tolerance—the ability of a flow graph or state to absorb errors yet still produce acceptably accurate results; (3) energy usage—the consumption of electrical power by the information integration; (4) accuracy—the reliability or correctness of the results from the information integration; (5) monetary cost—the monetary cost to construct and carry out the information integration; (6) maintainability—the ability to maintain or upkeep the information integration (a simpler information integration flow graph may have a higher maintainability as compared to a more complex information integration flow graph); and (7) scalability or capacity—the ability of an information integration flow graph to accommodate an increase in a number of tuples or an amount of data being integrated.

FIG. 16A illustrates method 300, a particular example of method 270, that may be used by manager 46 for carrying out a heuristic to selectively apply transitions to flow graph 64 (or derivatives thereof) and to identify a modified flow graph that best meets one or more objective functions. In method 300, state space manager 46 focuses on two objectives: performance in the first phase and additionally fault tolerance in the second phase. M indicated by step 302, during the first phase, state space manager 46 applies performance and parallelism transitions aimed at enhancing computing performance or computing cost based upon a length of a chain operators or nodes. Examples of "performance" transitions include SWA, DIS and FAC transitions. Parallelism transitions comprises transitions or combinations of transitions that create parallel lines or parallel branches of operators. Examples of parallelism include partition parallelism and pipeline parallelism. Partitions parallelism utilizes PAR transitions. Pipeline parallelism utilizes combinations of SWA with either DIS or FAC transitions to put more operations in one chain.

Method 300 favors the creation of large chains of operations; for resolving conflicts such as in which chain of two adjacent ones an operation should be placed, it first prefers the chain closer to the start of the flow and then, the larger one. This phase creates a queue of states QP (a state constituting an entire flow graph) ordered by increasing order of cost. QP contains only states satisfying the performance objective from OF.

As indicated by step 304, during the second phase, state space manager 46 applies one or more fault tolerance transitions—transitions aimed at increasing fault tolerance—to the modified flow graphs in the queue of states QP. Examples of fault tolerance transitions include replication transitions and recovery point transitions.

In one example, state space manager 46 picks a state from QP and tries replication in flow parts containing operations with cost less than a threshold value $\theta$. Threshold $\theta$ is a tunable parameter; its default value is $$\frac{1}{k} \cdot \sum_{i=1}^{k} c_{v_i},$$

an average of the node costs for a flow graph are flow graph portion containing k operators or nodes. If there are operations with cost greater than cost threshold θ, manager 46 may follow method 340 shown in FIG. 17.

As indicated by step 342 in FIG. 17, manager 46 identifies those nodes with the cost greater than the cost threshold θ, wherein the node has a maintenance cost less than a cost of redoing the particular node from a latter of a previous checkpoint (a previous recovery point in the chain) and the start of the flow graph to the recovery point node. As indicated by step 344, manager 46 adds a recovery point to each node or operation identified in step 342. All newly created states satisfying OF are added to a candidate list (which in some examples may also include the original states of Qp) and the process goes on until the queue QP is emptied.

Figure 19:
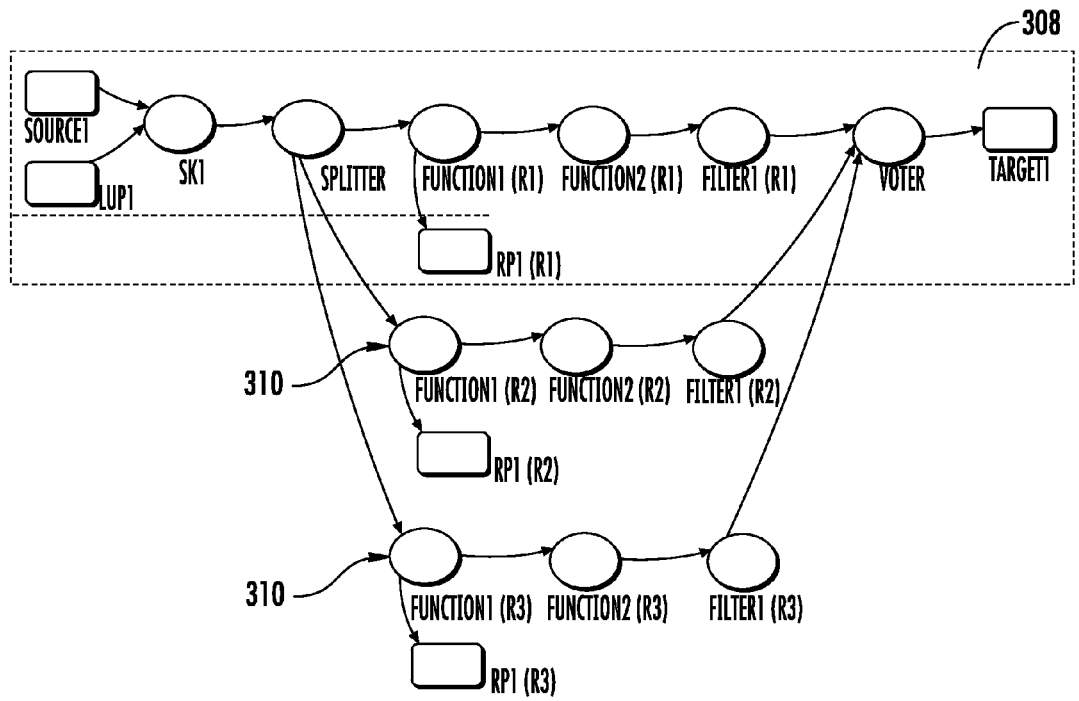
FIG. 19 is a diagram illustrating an example of a replication transition applied to the flow graph of FIG. 12.

As indicated by step 306 in FIG. 16A, state space manager 46 then examines the candidate list to identify the state, i.e., modified flow graph, that satisfies OF with the lowest cost. As noted above, in some examples, this cost may be computing complexity. In other examples, this cost may be freshness. In other examples, state space manager 46 may identify the state which best satisfies multiple different cost types: FIG. 19 illustrates an example flow graph 308 to which replications 310 have been added by manager 46 using method 300.

FIG. 18 is a flow diagram illustrating method 320, another method by which state space manager 46 may apply a heuristic to selectively apply transitions to flow graph 64 (or derivatives thereof) and to identify a modified flow graph that best meets one or more objective functions. Method 320 is similar to method 300 in that method 320 includes steps 302, 304, and 306, described above. Method 320 additionally comprises steps 322, 324 and 326. As indicated by step 322, state space manager 46 determines whether any the state satisfy the one or more cost criteria. If the state or flow graph of the lowest cost satisfies the cost criteria, manager 46 selects a particular state or flow graph first step 108 in FIG. 2 and outputs the identified state having the lowest cost per step 110 shown in FIG. 2. In the example shown in FIG. 1, graphical user engine 48 displays the graph using graph visualization module 86 to present the selected flow graph on display 36. The selected state or flow graph and the output of data and export 88 in the form of a file 90, such as a GML, xLM, JPEG or GIF file. As further shown by the left side of FIG. 1, the selected state our flow graph may be translated by parser 60 back into the tool specific xML format or other format from which the initial flow graph 64 was derived.

Figure 20:
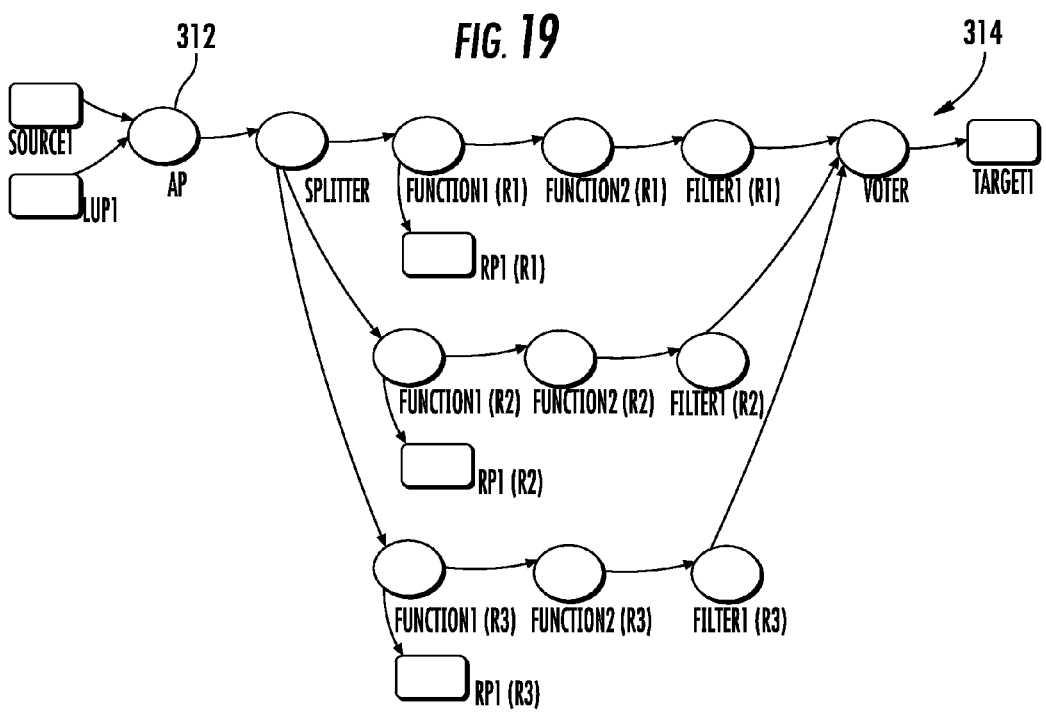
FIG. 20 is a diagram illustrating an example of an add shedder transition applied to the flow graph of FIG. 19.

If none of the candidate states satisfies the predetermined cost criteria, state space manager applies the above-described ad shedder transition to the initial integration flow graph and the method 320 is performed once again upon the initial integration flow graph 64 including the add shedding transition. FIG. 20 illustrates an example where the flow graph shown in FIG. 19 does not satisfy a cost criteria and where an ad shedder operator or node 312 is added to form a new flow graph 314.

Example candidate places for adding a shedder operation are: before expensive operators or after a series of inexpensive operators (according to 0) and close to recovery points (or other intermediate nodes). The chain of unary operations where manager 46 places the shedder contains a recovery point; (if not, the recovery point is added). The schema of the closest to the shedder recovery point is enriched by an extra field showing if the stored tuple has been shed or not. Typically, pursuant to method 320, manager 46 tries to put a shedder in a position ps s.t. distance (ps; pt) is minimum, where pt is the position of the farthest target data store. If no solution is found, then positions closer to the flow beginning are examined. In any case, creating the same state twice or cycles in the space state are not allowed.

In the example, the shedder's sampling factor f is determined as follows. The OF specifies an execution time window w and manager 46 may estimate the execution time t of a flow based on its processing cost (the cost is proportional to execution time). The available time for recovery from a failure is $t_r=(w-t)$. Essentially, after the first phase of method 320, step 302, the queue QP of states is ordered in decreasing order of $t_r$. In the second phase, step 304, due to the addition of the REP and aRP transitions, the execution time increases to t'. If w<t', then manager 46 goes to the third phase. The sampling factor is determined so that $|w-t'| \to 0$. The approximation policy $P_A$ is an input to manager 46; otherwise, the default policy is uniform sampling. Note that aAP is applied by manager 46 even if an OF is only about performance. This happens when the flow execution time t is larger than w. Then, the sampling factor f is chosen so that $|w-t| \to 0$.

Drawing Flow Graphs. Typically, when a flow design 56 comes to the Optimizer 34, it already contains location coordinates for every flow node. If the flow does not come with location information, flow manager enriches its nodes with appropriate coordinates. The algorithm for calculating node coordinates uses a set of tunable parameters: xcnt, ycnt, xLoc, yLoc, xOld, yOld, xo_set, yo_set, and dtop (dtop indicates the desired distance from the top of the design canvas).

During optimization through the application of one or more transitions, the initial integration flow graph 64 changes. For example, the position of flow nodes may change, new nodes are added to the graph or removed from it, and so on. To facilitate the display of a modified flow graph derived from flow graph 64 by GUI engine 48 and display 36, flow manager 42 may follow method 400 shown in FIG. 21. Step 402 in FIG. 21 depicts the application of a transition to an existing flow graph or state by state space manager 46.

As indicated by step 404, flow graph 42 enriches the nodes of the modified flow graph with modified coordinates which are based on the location coordinates of the original nodes, but offset as appropriate to accommodate newly added notes are transitions. In particular, flow graph 42 utilizes the location coordinates of the initial integration flow graph 64 or the location coordinates of another flow graph being modified to dynamically calculate new location coordinates for each node in the new flow graph. However, in the example illustrated, the application of a transition to a flow graph results in modification of only a portion of the nodes of the flow graph rather than all the notes of the flow graph. Instead of drawing the modified flow graph from scratch; optimizer 34 maintains the original drawing and make appropriate changes on top of it. Each applied transition result in an incremental change of the original drawing of original flow graph, effecting location coordinates of only those other nodes (and edges) in the neighborhood of the applied transition.

Figure 21:
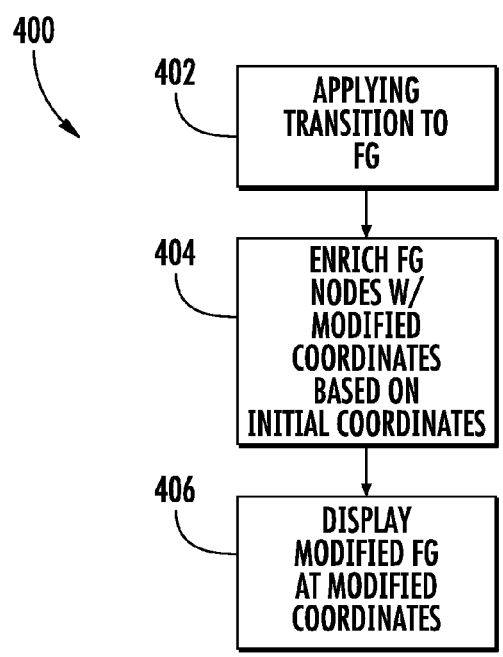
FIG. 21 is a flow diagram of an example method for displaying a modified flow graph.

As indicated by step 406 in FIG. 21, graphical user interface engine 48 displays the modified flow graph using the modified coordinates. As a result, the modified information integration flow graph that is presented on display 36 or otherwise outputted as export 88, in large part, still resembles the flow graph from which it was derived and with which the designer already has familiarity.

Figure 22:
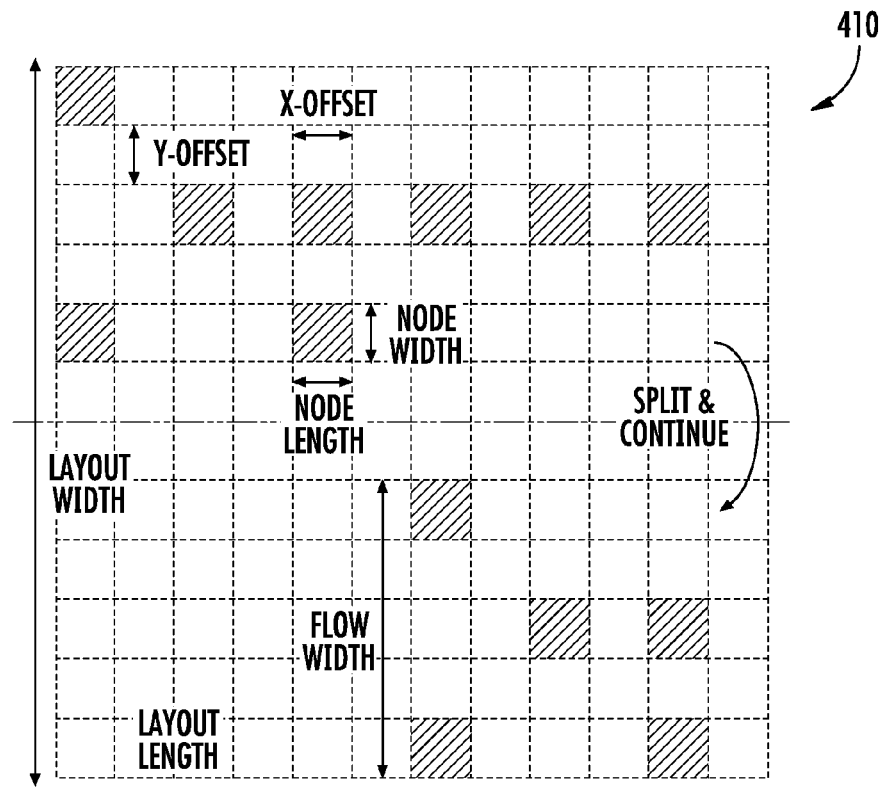
FIG. 22 is a diagram illustrating an example of layout expansion for a modified flow graph.

In operation, if the changes in a neighborhood as a result of a transition application affect a larger portion of the graph, flow manager 42 expands the areas around the affected neighborhood trying to minimize the impact of changes in the graph (conservative expansion). This expansion is realized having in mind a grid as shown in FIG. 22. The visualization area 410 (w-layout; l-layout) is adjusted to the flow graph size. Depending on the length (l) and width (w) of the flow graph, flow manager 42 decides whether to design the flow in length (one large chain) or to split it in multiple parts and design it in width (multiple parts, one below another). Flow manager 42 sets x- and y-offsets based on the length and width of virtual bounding boxes for nodes. Zoom-in/out functionality is offered too.

FIGS. 12-15 illustrate the application of a swap (FIG. 13), distribution (FIG. 14), partitioning (FIG. 15), replication (FIG. 19) and add shedding (FIG. 20). Each of the above descriptions and illustrated example pseudo-codes of such transitions specifically describes how location coordinates of a node are modified in response to application of a transition. For all transitions, there is a background process that checks whether the new placement of nodes fits well in the current layout. If a transition tries to place a node onto (or near) an occupied cell of the grid depicted in FIG. 22, then the conservative expansion kicks in. The grid sensitivity is tied to a system parameter that tunes how close to an occupied grid cell we can place a new node; the default value is zero, which means that the expansion starts when we try to reuse a grid cell.

Optimization Monitoring. In addition to simply outputting an information integration flow graph that satisfies the OF with the lowest cost, optimizer 34 further facilitates monitoring of and user controlled experimentation on the optimization process. In the example illustrated, utility functions module 50 (shown FIG. 1) connects optimizer 34 to a library of general-purpose functions and alogorithms, like graph-related activities (graph traversal of rhythms), error handling features, debugging features, monitoring activities and so on.

Figure 23:
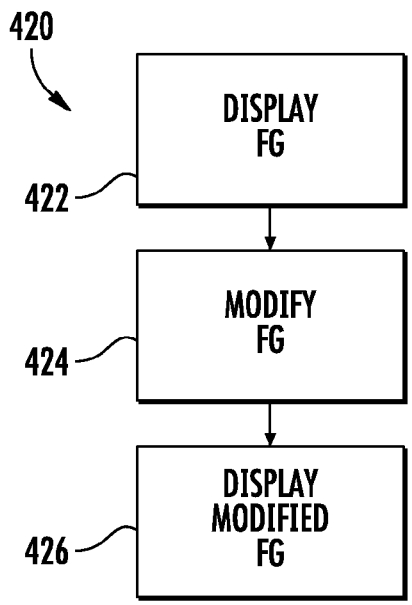
FIG. 23 is a flow diagram of an example method for displaying a modified flow graph.

FIG. 23 is a flow diagram illustrating an example method 420 by which optimizer 34 facilitates monitoring of the optimization process. As indicated by step 422, state space manager 46 displays a flow graph, either an expanded version including nodes and edges or a consolidated version represented as a bubble, on display 36. As indicated by step 424, state space manager 46 modifies the displayed flow graph by applying one or more transitions according to a heuristic or other algorithm. According to step 426, the modified flow graph is displayed on display 36 by state space manager 46.

Figure 24:
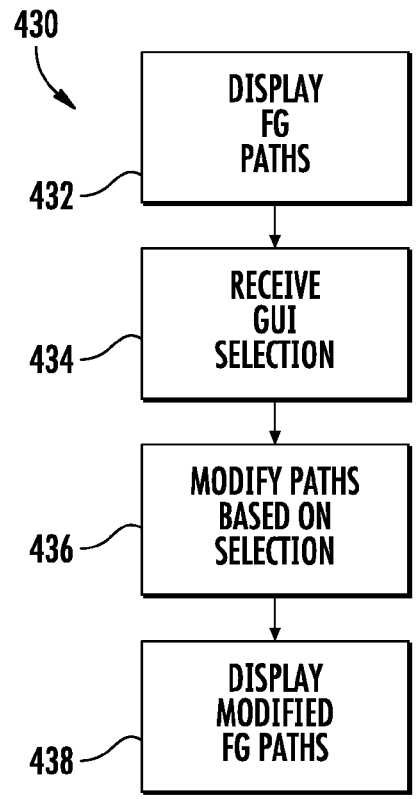
FIG. 24 is a flow diagram of an example method for displaying flow graph paths.
Figure 25:
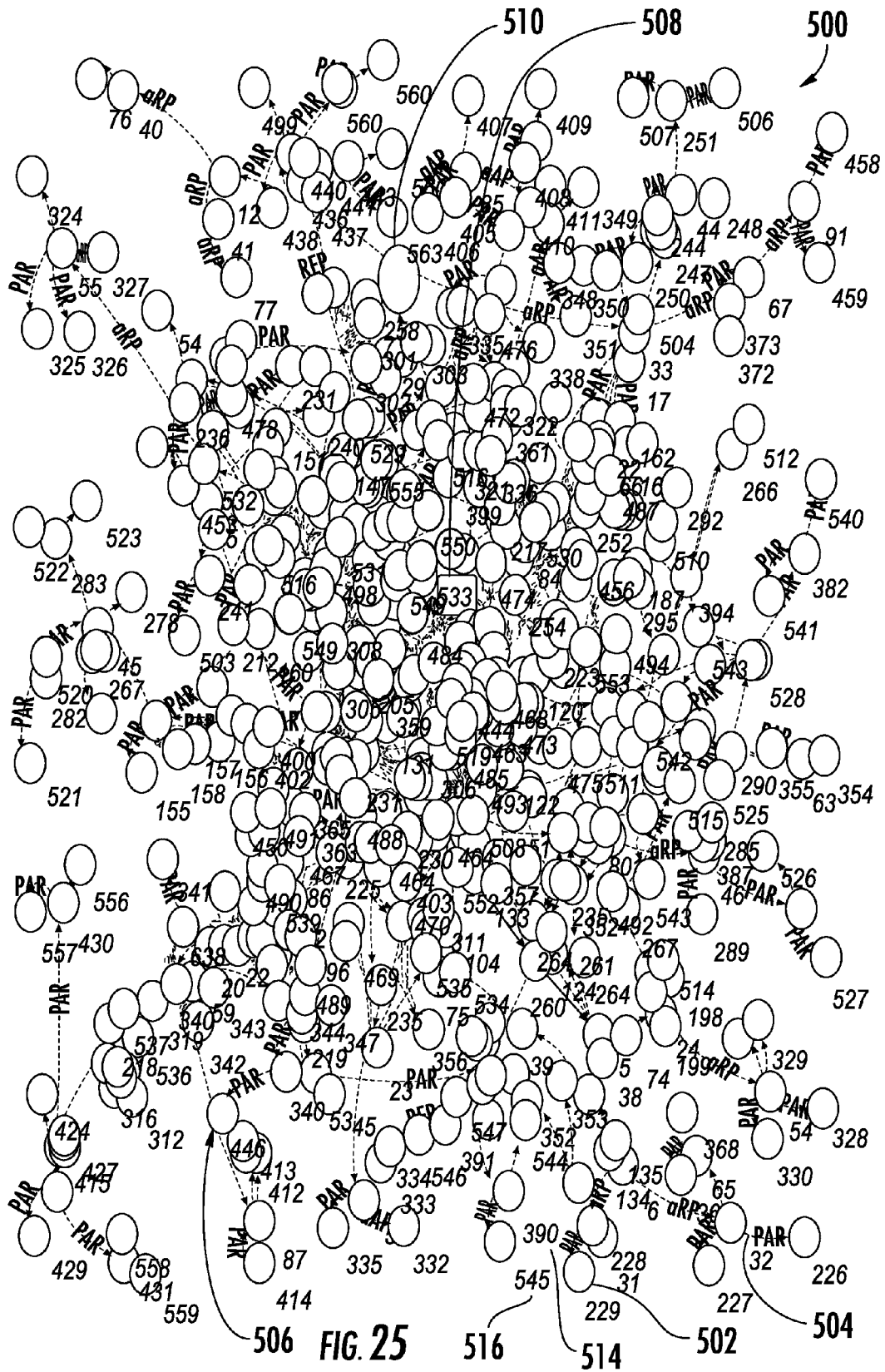
FIG. 25 is a diagram of an example graphical user interface formed by a state space of flow graph paths.

FIG. 24 is a flow diagram illustrating another method 430 by which optimizer 34 facilitates monitoring of the optimization process. As indicated by step 432, state space manager 46 displays a plurality of flow graph paths 506. As noted above, during optimization, state space manager 46 applies transitions to flow graph 64 to produce a modified flow graph or state 502. Additional transitions may be subsequently applied to the modified flow graph to produce a further modified flow graph. Flow graphs build upon one another in a sequence to form a chain or path 506 of flow graphs or states 502. FIG. 25 illustrates one example state space 500 produced by state space manager 46 and visually represented by display 36. Each generated flow graph or state 502 is represented by state "bubble". The transitions 504 applied to the individual states 502 to form further modified states 502 are represented interconnecting lines or edges and labeled with the specific transition that was applied. For purposes of illustration, only a few transition labels are illustrated. In one implementation, such transition labels in busy or crowded areas of the displayed state space are only viewable upon the user enering commands causing the display to zoom in on, enlarge or expand the particular crowded or busy area. In one implementation, space manager 46 allows the person or user to selectively filter what is displayed. For example, the user may choose to omit transition labels or choose to omit the display of state numbers or identifiers. The interconnecting lines or edges representing transitions 504 connect individual states 502 to form different chains or paths 506.

Using the visually depicted state space 500, a designer or decision-making see the original state 508, the optimal or minimal cost state 510 which is suggested as a solution and the various other states 502 visited by the search algorithm or heuristic. In the example illustrated, each state 502 is annotated with the sequence ID 512 and a time stamp 516 based on their creation sequence and time, respectively. In other examples, one or more of such pieces of information depicted on the visually displayed state space 500 may be omitted. In some examples, additional pieces of information may be depicted on the visually displayed state space 500.

In the example illustrated, state space manager 46 presents state space 500 as an animation on display 36. As each transition is applied, state space manager 46 ads a bubble, representing the resulting newly created flow graph or state, and the . corresponding line or edge, representing the transition that was applied, to the state space 500 presently on display 36. As a result, as state space 500 is constructed, a designer or decision-maker may monitor its construction in real time, viewing how the state space 500 develops.

As indicated by step 434 in FIG. 24, state space manager 46 presents state space 500 as part of a graphical user interface, wherein portions of the depicted state space 500 may be selected, serving as an input or command. Portions of state space 500 may be selected using input 32 (a mouse, stylus or the like which locates a cursor on display 36) or by using input 32, wherein the display 36 is a touch screen. Examples of commands that may be input by selecting specific portions of the displayed state space 500 include, but are not limited to: (1) halting the optimization process or algorithm, such as by selecting an empty space or area of state space 500 or by selecting an additional dedicated icon, (2) identifying an existing flow graph or state 502 from which a further search may be formed by applying one or more additional transitions, (3) identifying a particular transition in the displayed state space 500 that should be changed to a different transition, (4) identifying a particular flow graph or state for detailed viewing and/or (5) identifying a particular path of flow graphs and their associated transitions for further detailed viewing or modification.

As indicated by step 436 in FIG. 24, once state space manager 46 receives a command or input based upon the portion of the graphical user interface provided by state space 500 that has been selected, manager 46 may modify one or more paths 506. As indicated by step 438, the modified flow graph paths 506 are then displayed upon display 36. In one example, the entire modified state space 500 may be displayed. In another example or operating under a different mode, manager 46 may present a portion of the state space 500 which includes the modified path or paths.

Figure 26:
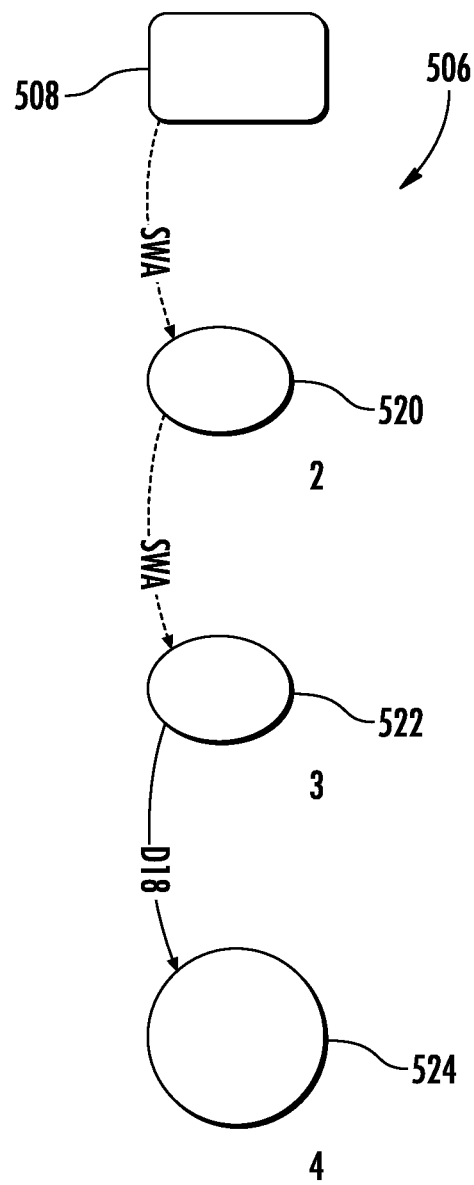
FIG. 26 is a diagram of a single flow graph path isolated for display from the state space of FIG. 25

FIG. 26 illustrates at least a portion of display 36 generated by GUI engine 48 in response to a person selecting a particular flow path 506 out of the multiple flow paths 506 displayed as part of state space 500 on display 36. As shown by FIG. 26, the particular flow path 506 illustrated starts with an initial information integration flow graph 64 which is modified by applying a swap transition to form the flow graph or state 520. As shown by FIG. 26, state space manager 46 further applies an additional swap transition to state 520 to form state 522. Lastly, manager 46 applies a distribution transition to state 522 to come to the current cost optimal state 524. As shown by FIGS. 25 and 26, the initial integration flow graph 64 may be represented as a state 508 with a different color, shape or other characteristic, the intermediate states 502 may be represented by different colors and the final suggested state 524 may represented by different color and/or different shape. In other examples, the states and transitions displayed in FIGS. 25 and 26 may be represented by other graphics or icons having other sizes, fonts, colors, shapes or configurations.

Figure 27:
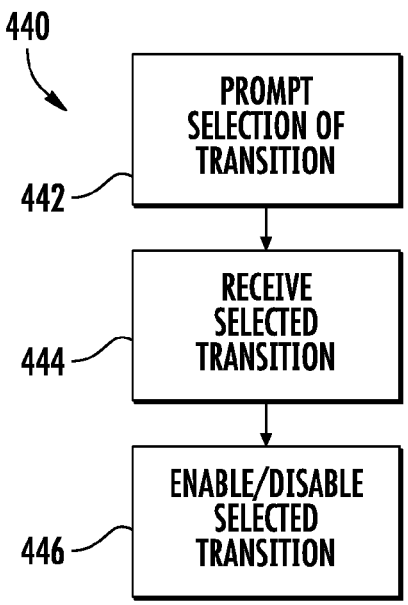
FIG. 27 is a flow diagram of an example method for enabling or disabling selected transitions.

In some circumstances, a state space 500 may be extremely large. State space manager 46 may allow person to selectively zoom in and size or scale state space 500 as desired. State space manager 46 may also allow a person to filter out those states resulting from the application of particular transitions. FIG. 27 is a flow diagram of a method 440 for selectively enabling or disabling transitions. As indicated by step 442, state space manager 46 prompts the selection of a transition. As indicated by step 444, state space manager 46 receives one or more selected transitions through input 32 (shown in FIG. 1). As indicated by step 446, based upon such input, state space manager 446 enables or disables the selected transition.

Figures 28, 29:
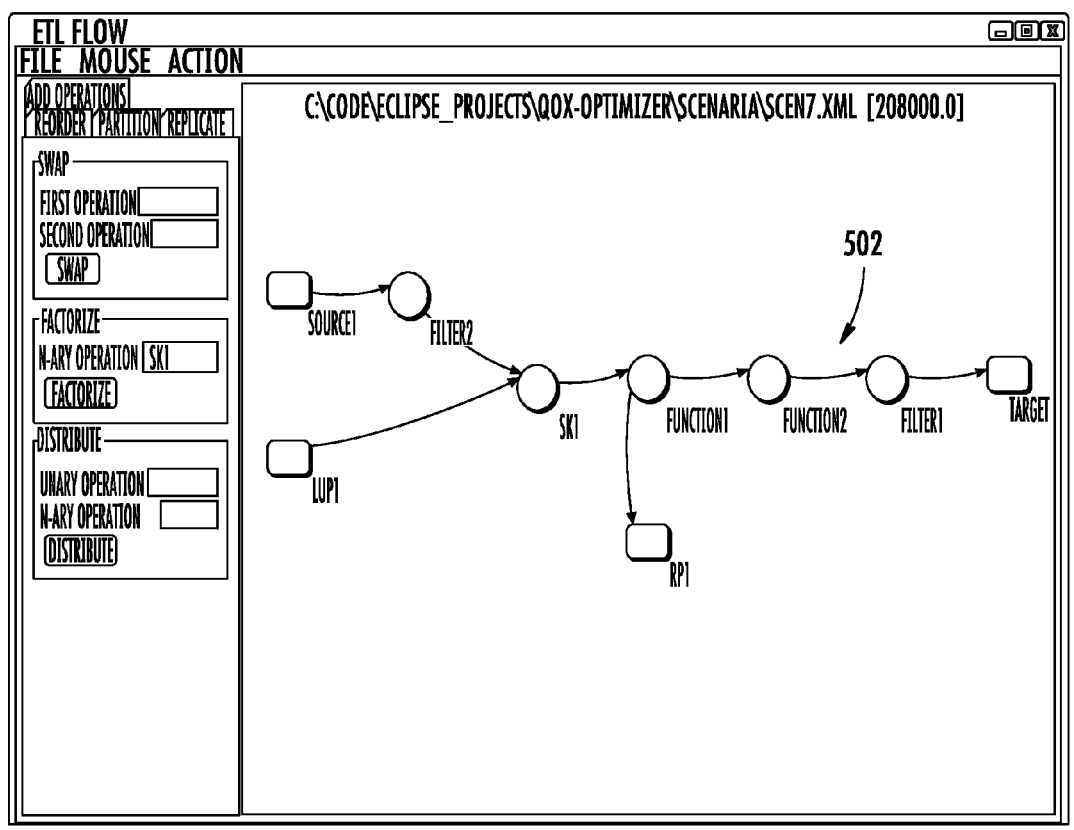
FIG. 28 the diagram of an example graphical user interface for the selection of transition strategies.
FIG. 29 is a screenshot of an example selected state displayed for selective modification.

FIG. 28 illustrates a list of transitions that may be displayed on display 36 and selected or deselected using input 32. In the example illustrated, those transitions selected with a check are enabled. In response to such selections, state space manager 46 may redisplay or re-present state space 500 with those states 502 resulting from the unselected transitions or disabled transitions being omitted. In another example, manager 46 may alternatively enable a person to select those transitions to be disabled rather than enabled.

In the example illustrated, state space manager 46 may prompt a person or user to select or enable one or more transitions (or alternatively to disable one or more transitions) at some point in time prior to the completion of state space 500. For example, as state space 500 is being constructed on display 36, a person may halt the optimization process (carrying out of the algorithm or heuristic) and then enable or disable particular transitions for when the construction of state space 500 is resumed. In one example, the enabling or disabling of particular transitions as shown in FIG. 26 may be done prior to the start of the construction of state space 500 by state space manager 46.

In one example, state space manager 46 offers several search of algorithms or heuristics for a person to choose from. The designer may also choose what strategies to use. In doing so, the designer is able to examine different optimization policies and perform what-if analysis. Because manager 46 permits different search algorithms to be selected for use and permits particular transitions to be enabled or disabled, processing load and time for manager 46 may be reduced.

In the example illustrated, state space manager 46 uses a parameterized logger module. Depending on the desired detail level, Optimizer 34 outputs various kinds of debugging information. Example information includes:

execution statistics: e.g., memory/cpu usage, elapsed time, etc. per state or transition type etc., number of states processed/visited/ . . . , states satisfying the objective function, flow costs, and so on;

decision explanation: e.g., why a certain search path was aborted or preferred; why a specific flow point was chosen for adding a specific operation like a recovery point, a merger, a router, a shedder, etc.; why a specific flow part was partitioned or replicated; and so on;

optimization progress: e.g., what set of transitions are tested on a given moment, state space size, flow cost evolution, proximity of state to objective, etc.; and flow errors: if the input flow is malformed, suitable messages indicate such problems and so on.

For example, in one example, execution statistics may be presented in a corner of the display. A person may move a cursor over a particular illustrated state 502 which results in an indication of optimization progress. For example, positioning of the cursor over a particular illustrated state 502 may result in an indication as to how close the selected state or flow graph is to achieving an objective (e.g. an amount of time at the state exceeds a predefined computing time or cost objective, the extent to which the fault tolerance of a state is less than the fault tolerance goal, the monetary amount by which the state exceeds the monetary cost objective and the like). A person may move a cursor over a particular illustrated transition to cause the rationale for the transition to be displayed. For example, the display may indicate that an add shedding transition was added to reduce computing cost or that a recovery point replication transition was added to increase fault tolerance.

According to one example, a designer or user of optimizer 34 may identify a particular transition or state for a detailed view. For example, a person may move the cursor over a particular illustrated state 502 (shown in FIG. 24) and select or click upon the underlying state 502 or may touch a particular display state 502, when a touch screen is employed, wherein a GUI engine 48, in response, visually presents on display 36 a complete detailed view of the selected state or flow graph. FIG. 29 illustrates one example of a particular state 502 selected using the graphical user interface shown in FIG. 25.

In addition to providing the designer or person with a detailed view of the nodes and edges of the individual flow graph or state 502, state space manager 46 also offers a test-bed environment for examining the application of transitions on a specific flow. The designer can test restructuring strategies like swap, factorize, and distribute; partition and replication, and also, may add new operators like a shedder. In the example illustrated, state space manager 46 prompts various selections on display 36 for replacing, removing or adding operations or nodes. Upon its creation, the modified flow graph resulting from the changes shown in FIG. 29 may be added to the state space 500 which is displayed on display 36. Thereafter, additional modifications may be made to the user modified flow graph 502 shown in FIG. 29 using one or more selected algorithms or heuristics.

Although the present disclosure has been described with reference to example embodiments, workers skilled in the art will recognize that changes may be made in form and detail without departing from the spirit and scope of the claimed subject matter. For example, although different example embodiments may have been described as including one or more features providing one or more benefits, it is contemplated that the described features may be interchanged with one another or alternatively be combined with one another in the described example embodiments or in other alternative embodiments. Because the technology of the present disclosure is relatively complex, not all changes in the technology are foreseeable. The present disclosure described with reference to the example embodiments and set forth in the following claims is manifestly intended to be as broad as possible. For example, unless specifically otherwise noted, the claims reciting a single particular element also encompass a plurality of such particular elements.

What is claimed is:

1. A computer implemented method comprising:
estimating a freshness cost for each of a plurality of information integration flow graphs using at least one formula comprising a function different than the information integration flow graphs; and
selecting one of the plurality of information integration flow graphs based upon the estimated freshness cost, wherein the freshness cost for each of the plurality of information integration flow graphs is calculated by:
estimating a first time for each information integration flow graph to start operations on a first tuple of a number of tuples; and
estimating a second time for each information integration flow graph to output a final tuple of the number of tuples, wherein the estimated freshness cost for each information integration flow graph is based upon the first time, the second time and the number of tuples.

2. The computer implemented method of claim 1 further comprising:
estimating a freshness cost for an operator of one of the plurality of information integration flow graphs using at least one formula comprising a function different than the information integration flow graphs; and
selectively applying a transition to said one of the information integration flow graphs based upon the estimated freshness cost for the operator.

3. The computer implemented method of claim 2, wherein the transition is selected from a group of transitions consisting of: swap, distribution, partitioning, replication, factorization, add recovery point and add shedding.

4. The computer implemented method of claim 1, wherein the second time is estimated using a final output time function that is weighted based upon the presence of a second operator parallel to the first operator to share information operational load with the first operator.

5. The computer implemented method of claim 1, wherein the selected one of the plurality of information integration flow graphs is additionally based upon an additional calculated cost for each of the plurality of information integration flow graphs.

6. The computer implemented of claim 5, wherein the additional calculated cost comprises computational complexity.

7. The computer implemented method of claim 1, wherein the freshness cost is calculated for each of a plurality of information integration flow graphs on a same model.

8. An apparatus comprising:
a tangible non-transient computer readable medium comprising instructions for directing a processor to:
estimate a freshness cost for each of a plurality of information integration flow graphs using at least one formula comprising a function different than the information integration flow graphs; and
select one of the plurality of information integration flow graphs based upon the estimated freshness cost, wherein the freshness cost for each of the plurality of information integration flow graphs is calculated by:
estimating a first time for each information integration flow graph to output a first tuple of a number of tuples;
estimating a second time for each information integration flow graph to output a final tuple of the number of tuples, wherein the estimated freshness cost for each information integration flow graph is based upon the first time, the second time and the number of tuples.

9. The apparatus of claim 8, wherein the computer readable medium further comprises instructions for directing the processor to:
estimate a freshness cost for an operator of one of the plurality of information integration flow graphs using at least one formula comprising a function different than the information integration flow graphs; and
selectively apply a transition to said one of the information integration flow graphs based upon the estimated freshness cost for the operator.

10. A computer implemented method comprising:
estimating a freshness cost for an operator of an information integration flow graph using at least one formula comprising a function different than the information integration flow graphs; and
selectively applying a transition to the information integration flow graph based upon the estimated freshness cost for the operator, wherein the freshness cost for each of the plurality of information integration flow graphs is calculated by:
estimating a first time for the operator to output a first tuple of a number of tuples; and
estimating a second time for the operator to output a final tuple of the number of tuples, wherein the estimated freshness cost for the operator is based upon the first time, the second time and the number of tuples.

* * * * *

UNITED STATES PATENT AND TRADEMARK OFFICE
CERTIFICATE OF CORRECTION

PATENT NO.        : 8,918,358 B2
APPLICATION NO.   : 13/274317
DATED             : December 23, 2014
INVENTOR(S)       : Alkiviadis Simitsis et al.

Page 1 of 1

It is certified that error appears in the above-identified patent and that said Letters Patent is hereby corrected as shown below:

In the Claims

In column 23, line 41, in Claim 6, delete "of" and insert -- method of --, therefor.

Signed and Sealed this
Fifth Day of May, 2015

Michelle K. Lee
*Director of the United States Patent and Trademark Office*